US010999605B2

(12) United States Patent
Wang et al.

(10) Patent No.: US 10,999,605 B2
(45) Date of Patent: May 4, 2021

(54) SIGNALING OF IMPORTANT VIDEO INFORMATION IN FILE FORMATS

(71) Applicant: QUALCOMM Incorporated, San Diego, CA (US)

(72) Inventors: Ye-Kui Wang, San Diego, CA (US); Thomas Stockhammer, Bergen (DE)

(73) Assignee: Qualcomm Incorporated, San Diego, CA (US)

( * ) Notice: Subject to any disclaimer, the term of this patent is extended or adjusted under 35 U.S.C. 154(b) by 109 days.

(21) Appl. No.: 15/866,262

(22) Filed: Jan. 9, 2018

(65) Prior Publication Data

US 2018/0199071 A1 Jul. 12, 2018

Related U.S. Application Data

(60) Provisional application No. 62/444,725, filed on Jan. 10, 2017, provisional application No. 62/445,151, filed on Jan. 11, 2017.

(51) Int. Cl.
*H04N 19/70* (2014.01)
*H04N 19/184* (2014.01)
(Continued)

(52) U.S. Cl.
CPC ........... *H04N 19/70* (2014.11); *H04N 19/184* (2014.11); *H04N 19/44* (2014.11);
(Continued)

(58) Field of Classification Search
None
See application file for complete search history.

(56) References Cited

U.S. PATENT DOCUMENTS 9,161,039 B2    10/2015   Wang
9,521,393 B2    12/2016   Wang et al.
(Continued)

FOREIGN PATENT DOCUMENTS

CN       1666195 A     9/2005
CN     102648629 A     8/2012
(Continued)

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
(Continued)

*Primary Examiner* — James M Anderson, II
(74) *Attorney, Agent, or Firm* — Shumaker & Sieffert, P.A.

(57) ABSTRACT

A device for processing media content obtains data from a box within a file conforming to a file format for a video codec, the box comprising a syntax structure that includes the data, the file being associated with the media content and the media content being coded according to the video codec; and determines, based on the data obtained from the box, whether to accept or reject the media content associated with the file. A device for generating media content generates data in a box within a file conforming to a file format, the box comprising a syntax structure that includes the data, the file being associated with the media content, wherein the data is for use in determining whether a client is to accept or reject the media content associated with the file; and outputs the file.

25 Claims, 8 Drawing Sheets

(51) Int. Cl.
H04N 19/44 (2014.01)
H04N 21/845 (2011.01)
H04N 21/854 (2011.01)
H04N 21/235 (2011.01)

(52) U.S. Cl.
CPC ..... *H04N 21/2353* (2013.01); *H04N 21/8451* (2013.01); *H04N 21/85406* (2013.01)

(56) References Cited

U.S. PATENT DOCUMENTS

| | | | |
|---|---|---|---|
| 2013/0235152 | A1 | 9/2013 | Hannuksela et al. |
| 2014/0086343 | A1 | 3/2014 | Wang |
| 2017/0347109 | A1 | 11/2017 | Hendry et al. |
| 2017/0347165 | A1 | 11/2017 | Wang |
| 2017/0347166 | A1 | 11/2017 | Wang |
| 2018/0242006 | A1 * | 8/2018 | Kerofsky ............. H04N 19/186 |

FOREIGN PATENT DOCUMENTS

| | | | | |
|---|---|---|---|---|
| EP | 2898698 | A1 | 7/2015 | |
| EP | 2898698 | B1 * | 7/2016 | ............. H04N 19/70 |
| WO | 2011049517 | A1 | 4/2011 | |
| WO | WO-2011049517 | A1 * | 4/2011 | ........... H04N 21/235 |
| WO | 2014047204 | A1 | 3/2014 | |
| WO | 2014047613 | A1 | 3/2014 | |
| WO | 2014107396 | A1 | 7/2014 | |

OTHER PUBLICATIONS

International Standard ISO/IEC 14496-12, Information Technology—Coding of audio-visual objects—Part 12: ISO base media file format, Third Edition, Oct. 15, 2008, 120 pp.
"Text of ISO/IEC 14496-15 2nd edition," 91 MPEG Meeting; Jan. 1, 2010-Jan. 22, 2010; Kyoto; (Motion Picture Expertgroup or ISO/IEC JTC1/SC29/WG11), No. N11139, Jan. 22, 2010 (Jan. 22, 2010), XP030017636, ISSN: 0000-0030 the whole document.
"Technical Specification Group Services and System Aspects; Transparent end-to-end packet switched streaming service (PSS); 3GPP file format (3GP)," 3rd Generation Partnership Project, Release 12, 3GPP TS 26.244 V9.1.0, Dec. 2013, 61 pp.
"International Standard ISO/IEC 23008-2, Information Technology—High efficiency coding and media delivery in heterogeneous environments—Part 2 High Efficiency video coding," First Edition, Dec. 1, 2013, 312 pp.
"Information technology—Dynamic adaptive streaming over HTTP (DASH)—Part 1: Media presentation description and segment formats," ISO/IEC 23009-1, International Standard, Apr. 1, 2012, 132 pp.
Samuelsson, et al., "Conversion and Coding Practices for HDR/WCG Y'CbCr 4:2:0 Video with PQ Transfer Characteristics (Draft 3)," Joint Collaborative Team on Video Coding (JCT-VC) of ITU-T SG 16 WP 3 and ISO/IEC JTC 1/SC 29/WG 11, 25th Meeting; Oct. 14-21, 2016, document: JCTVC-Y1017, 30 pp.
ITU-R Recommendation BT.2020 "Parameter Values for UHDTV systems for Production and International Programme Exchange" Aug. 2012, 7 pp.
ITU-R Recommendation BT.709-5, "Parameter values for the HDTV standards for production and international programme exchange," Apr. 2002, 32 pp.
Sullivan, et al., Editors' draft revision to ITU-T Rec. H.264 ISO/IEC 14496-10 Advanced Video Coding—in preparation for ITU-T SG 16 AAP Consent (in integrated form), Joint Video Team (JVT) of ISO/IEC MPEG & ITU-T VCEG (ISO/IEC JTC1/SC29/WG11 and ITU-T SG16 Q.6), Document: JVT-AA007, Filename: JVT-AD007.doc, 30th Meeting: Geneva, CH, Jan. 29-Feb. 3, 2009, 683 pp.
Gellens, et al., "The 'Codecs' and 'Profiles' Parameters for "Bucket" Media Types," Internet Engineering Task Force, RFC 6381, Aug. 2011, 19 pp.
BT.1361 : Worldwide unified colorimetry and related characteristics of future television and imaging systems, Recommendation BT.1361-0, Feb. 1998, 13 pp.
BT.470-6: Conventional Television Systems, Recommendation ITU-R BT.470-6, Feb. 2005, 36 pp.
BT.1358-1: Studio parameters of 625 and 525 line progressive television systems, Recommendation ITU-R BT.1358-1, Sep. 2007, 11 pp.
Frajdh P., et al., "File Format Video Requirements," 90 MPEG Meeting, Oct. 26, 2009-Oct. 30, 2009, Xian, (Motion Picture Expert Group or ISO/IEC JTC1/SC29/WG11), No. M16979, Oct. 23, 2009, XP030045569, 5 Pages.
Wang Y-K., et al., "14496-15: Exposing Important Information in Sample Entry and the Codecs Parameter" 117 MPEG Meeting, Jan. 16, 2017-Jan. 20, 2017, Geneva, (Motion Picture Expert Group or ISO/IEC JTC1/SC29/WG11), No. M39984, Jan. 11, 2017, XP030068329, 2 Pages.
International Search Report and Written Opinion—PCT/US2018/013113—ISA/EPO—dated Apr. 6, 2018.
"Studio encoding parameters of digital television for standard 4:3 and wide-screen 16:9 aspect ratios," Recommendation ITU-R BT.601-7, Mar. 2011, ITU-R Radiocommunication Sector of ITU, 20 pp.
"Multimedia systems and equipment—Colour measurement and management, Part 2-1: Colour management—Default RGB colour space—sRGB," IEC 61966-2-1, Oct. 1999, 54 pp. [uploaded in parts].
"Multimedia systems and equipment—Colour measurement and management—Part 2-4: Colour management—Extended-gamut YCC colour space for video applications—xvYCC," IEC 61966-2-4, Jan. 2006, 40 pp.
Francois et al., "Signalling, Backward Compatibility and Display Adaptation for HDR/WCG Video Coding, Draft 1," Joint Video Team (JVT) of ISO/IEC MPEG & ITU-T VCEG (ISO/IEC JTC1/SC29/WG11 and ITU-T SG16 Q.6), 25th Meeting; Chengdu, CH, Oct. 14-21, 2016, No. JCTVC-Y1012v2, 30 pp.
Choi B., et al., "WD on ISO/IEC 23000-20 Omnidirectional Media Application Format", Motion Picture Expert Group or ISO/IEC JTC1/SC29/WG11, Oct. 2016, Chengdu, CN, 62 pages.
"Information technology—JPEG 2000, image coding system," Part 12: ISO base media file format, ISO/IEC 15444-12, fifth edition, Feb. 20, 2015, 286 pp.
International Standard, "Information technology—Coding of audio-visual objects—Part 15: Carriage of network abstraction layer (NAL) unit structured video in the ISO base media file format," ISO/IEC FDIS 14496-15, Jan. 13, 2014, 178 pages.
International Standard, "Information technology—Coding of audio-visual objects JPEG 2000 Image coding system—Part 12: ISO base media file format," ISO/IEC 14496-12, Fifth edition, Feb. 20, 2015, 286 pages.
Second Written Opinion from International Application No. PCT/US2018/013113, dated Dec. 17, 2018, 8 pp.
International Preliminary Report on Patentability—PCT/US2018/013113, The International Bureau of WIPO—Geneva, Switzerland, dated Mar. 22, 2019 19 pgs.

* cited by examiner

SIGNALING OF IMPORTANT VIDEO INFORMATION IN FILE FORMATS

This Application claims the benefit of:
U.S. Provisional Patent Application 62/444,725 filed Jan. 10, 2017; and
U.S. Provisional Patent Application 62/445,151 filed Jan. 11, 2017, entire content of both being incorporated herein by reference.

TECHNICAL FIELD

This disclosure relates to processing video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques may perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, such as coding tree blocks and coding blocks. Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized.

After video data has been encoded, the video data may be packetized for transmission or storage. The video data may be assembled into a video file conforming to any of a variety of standards, such as the International Organization for Standardization (ISO) base media file format and extensions thereof.

SUMMARY

In general, this disclosure describes techniques related to signaling of important video information related to High Dynamic Range (HDR) video, Wide Colour Gamut (WCG) video, Virtual Reality (VR) content, and 360-degree video in easily accessible places in file formats such as in the sample entry and/or the codecs parameter. A potential benefit of having important video information in the sample entry and/or the codecs parameter is that the important video information can be easily exposed to and accessed by application clients, including adaptive streaming clients such as Dynamic Adaptive Streaming over HTTP (DASH) clients, to make content management decisions such as rejecting content, selecting content, accepting content, or requesting content.

According to one example, a method for processing media content includes obtaining data from a box separate from boxes comprising a bitstream of encoded video data, the box being within a file conforming to a file format for a video codec, the box comprising a syntax structure that includes the data, the file being associated with the media content, and the media content being coded according to the video codec; and determining, based on the data obtained from the box, whether to accept or reject the media content associated with the file.

According to another example, an apparatus for processing media content includes one or more storage media configured to store the media content; and one or more processing circuits coupled to the one or more storage media, the one or more processing circuits configured to: obtain data from a box separate from boxes comprising a bitstream of encoded video data, the box being within a file conforming to a file format for a video codec, the box comprising a syntax structure that includes the data, the file being associated with the media content and the media content being coded according to the video codec; and determine, based on the data obtained from the box, whether to accept or reject the media content associated with the file.

According to another example, a computer readable storage medium stores instructions that when executed by one or more processors, causes the one or more processors to obtain data from a box separate from boxes comprising a bitstream of encoded video data, the box being within a file conforming to a file format for a video codec, the box comprising a syntax structure that includes the data, the file being associated with the media content and the media content being coded according to the video codec; and determine, based on the data obtained from the box, whether to accept or reject the media content associated with the file.

According to another example, an apparatus for processing media content includes means for obtaining data from a box separate from boxes comprising a bitstream of encoded video data, the box being within a file conforming to a file format for a video codec, the box comprising a syntax structure that includes the data, the file being associated with the media content and the media content being coded according to the video codec; and means for determining, based on the data obtained from the box, whether to accept or reject the media content associated with the file.

According to another example, a method for processing media content includes generating data in a box separate from boxes comprising a bitstream of encoded video data, the box being within a file conforming to a file format, the box comprising a syntax structure that includes the data, the file being associated with the media content, wherein the data is for use in determining whether a client is to accept or reject the media content associated with the file; and outputting the file.

According to another example, an apparatus for processing media content includes one or more storage media configured to store the media content; and one or more processing circuits coupled to the one or more storage media, the one or more processing circuits configured to generate data in a box separate from boxes comprising a bitstream of encoded video data, the box being within a file conforming to a file format, the box comprising a syntax structure that includes the data, the file being associated with the media content, wherein the data is for use in determining whether a client is to accept or reject the media content associated with the file; and output the file.

According to another example, a computer readable storage medium stores instructions that when executed by one or more processors, causes the one or more processors to generate data in a box separate from boxes comprising a bitstream of encoded video data, the box being within a file conforming to a file format, the box comprising a syntax structure that includes the data, the file being associated with the media content, wherein the data is for use in determining whether a client is to accept or reject the media content associated with the file; and output the file.

According to another example, an apparatus for processing media content includes means for generating data in a box within a file conforming to a file format, the box comprising a syntax structure that includes the data, the file being associated with the media content, wherein the data is for use in determining whether a client is to accept or reject the media content associated with the file; and means for outputting the file.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
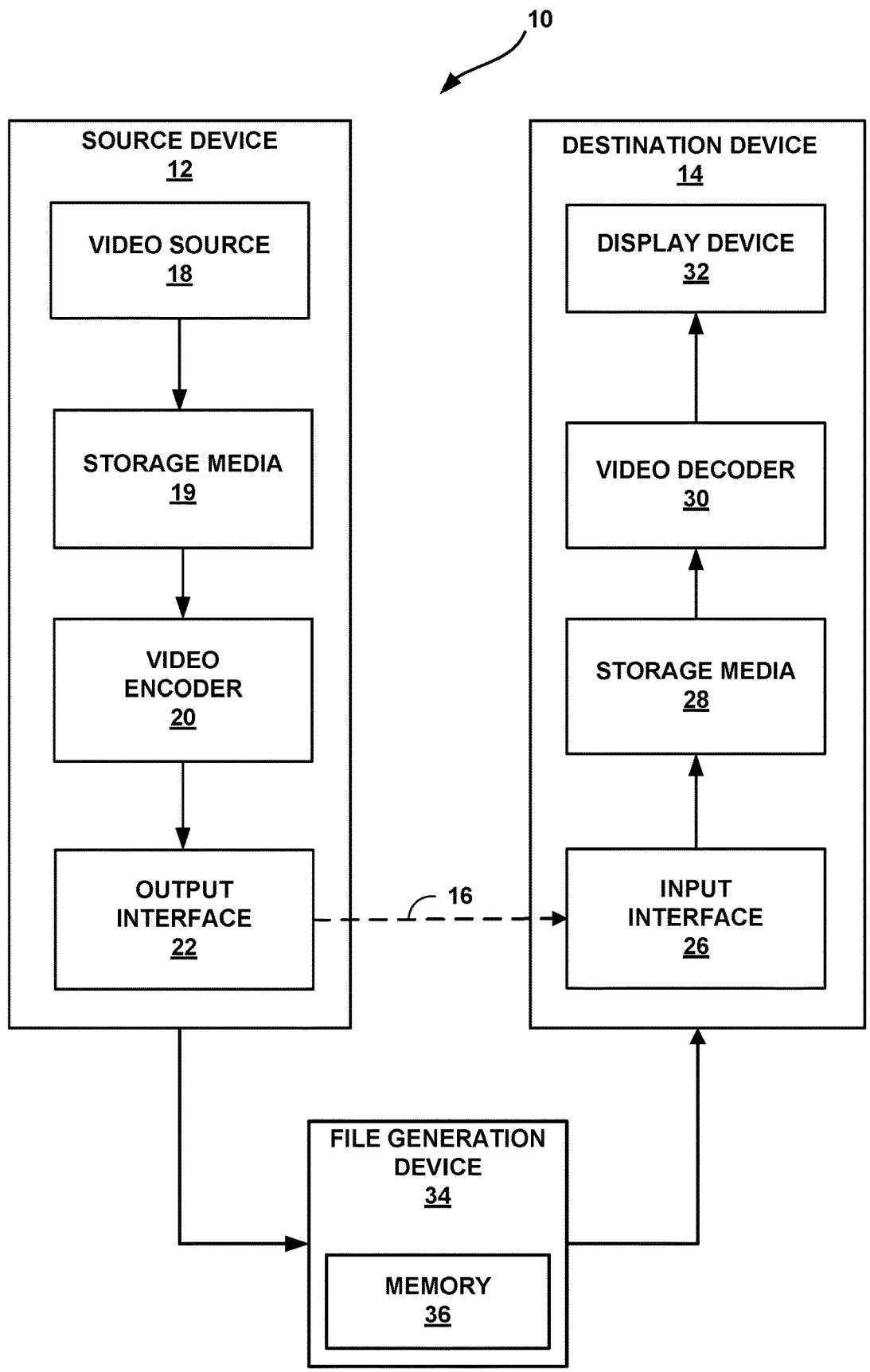
FIG. 1 is a block diagram illustrating an example video encoding and decoding system that may use one or more techniques described in this disclosure.

In general, this disclosure describes techniques related to signaling of important video information related to High Dynamic Range (HDR) video, Wide Colour Gamut (WCG) video, Virtual Reality (VR) content, and 360-degree video, as well as information on the presence of essential Supplemental Enhancement Information (SEI) messages in easily accessible places in file formats such as in the sample entry and/or the codecs parameter. A potential benefit of having important video information in the sample entry and/or the codecs parameter is that the important video information can be easily exposed to and accessed by application clients, including adaptive streaming clients such as Dynamic Adaptive Streaming over HTTP (DASH) clients, to make content management decisions, such as rejecting content, selecting content, accepting content, or requesting content. Although the techniques of this disclosure will primarily be explained with reference to DASH, the techniques of this disclosure may applicable to other types of adaptive streaming such as HTTP Live Streaming (HLS) and common media application format (CMAF) streaming.

In the context of this disclosure, important video information generally refers to video information that may be used by a device for purposes of content selection. For example, the device may process important information to determine if the device has the capabilities needed to process particular types of media content. Examples of important information include a video codec used to encode video data and the profile and level of the bitstream. Other types of important information for which the techniques of this disclosure may also apply will be described in more detail below.

A codec is typically designed to be generic enough to serve a wide range of applications and services. A "profile" generally refers to a subset of the entire bitstream syntax that is specified in a particular codec. Generally, different devices may utilize different profiles depending on the bit rates, resolutions, or quality needed for a particular application. Even for a particular profile, however, it is still possible to require a very large variation in the performance of encoders and decoders depending upon the values taken by syntax elements in the bitstream, and for many instances, it may not be practical for a device to implement a decoder capable of dealing with all possibly syntax values supported by a particular profile. Therefore, for profiles, codecs also typically specify various "tiers" and "levels" within each profile. A level of a tier is a specified set of constraints imposed on values of the syntax elements in the bitstream.

Not all devices are capable of processing video content for all codecs, and even if a particular device supports a certain codec, the device still may not necessarily be able to process video for all profiles of the codec or all tiers and levels of a profile. Using existing solutions, a video device must decode video usability information, which is included in the encoded video data. The techniques of this disclosure potentially enable a device to access important information regarding video data with less decoding and less processing, which may enable the device to make content selection decisions more rapidly and while utilizing less bandwidth, which can improve overall user experience.

As will be explained in greater detail below, utilizing the techniques of this disclosure, a device may obtain data from a box within a file conforming to a file format for a video codec and based on the data obtained from the box, determine whether to accept or reject the media content associated with the file. The box may be separate from boxes that include a bitstream of encoded video data. In other words, the box that includes the data may be a different box than the boxes that include the video coding layer (VCL) network abstraction layer (NAL) units and the non-VCL NAL units described below. The box may, for example, be a sample description box that contains a sample entry structure. A device may also obtain data from a media presentation description (MPD) data structure. By obtaining the data from the box within the file or an MPD, the device may be able to more quickly make the content selection decision, and thus provide a better overall user experience to a user of the device.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the encoded video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 are equipped for wireless communication. Thus, source device 12 and destination device 14 may be wireless communication devices. The techniques described in this disclosure may be applied to wireless and/or wired applications. Source device 12 is an example video encoding device (i.e., a device for encoding video data). Destination device 14 is an example video decoding device (i.e., a device for decoding video data).

The illustrated system 10 of FIG. 1 is merely one example. Techniques for processing video data may be performed by any digital video encoding and/or decoding device. In some examples, the techniques may be performed by a video encoder/decoder, typically referred to as a "CODEC." Source device 12 and destination device 14 are examples of such coding devices in which source device 12 generates coded video data for transmission to destination device 14. In some examples, source device 12 and destination device 14 operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

In the example of FIG. 1, source device 12 includes a video source 18, storage media 19 configured to store video data, a video encoder 20, and an output interface 22. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

Video source 18 is a source of video data. The video data may comprise a series of pictures. Video source 18 may include a video capture device, such as a video camera, a video archive containing previously captured video, and/or a video feed interface to receive video data from a video content provider. In some examples, video source 18 generates computer graphics-based video data, or a combination of live video, archived video, and computer-generated video. Storage media 19 may be configured to store the video data. In each case, the captured, pre-captured, or computer-generated video may be encoded by video encoder 20.

Output interface 22 may output the encoded video information to a computer-readable medium 16. Output interface 22 may comprise various types of components or devices. For example, output interface 22 may comprise a wireless transmitter, a modem, a wired networking component (e.g., an Ethernet card), or another physical component. In examples where output interface 22 comprises a wireless transmitter, output interface 22 may be configured to transmit data, such as encoded video data, modulated according to a cellular communication standard, such as 4G, 4G-LTE, LTE Advanced, 5G, and the like. In some examples where output interface 22 comprises a wireless transmitter, output interface 22 may be configured to transmit data, such as encoded video data, modulated according to other wireless standards, such as an IEEE 802.11 specification, an IEEE 802.15 specification (e.g., ZigBee™), a Bluetooth™ standard, and the like. In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

Destination device 14 may receive encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, output interface 22 may output data, such as encoded video data, to an intermediate device, such as a storage device. Similarly, input interface 26 of destination device 14 may receive encoded data from the intermediate device. The intermediate device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In some examples, the intermediate device corresponds to a file server. Example file servers include web servers, FTP servers, network attached storage (NAS) devices, or local disk drives.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives data from computer-readable medium 16. Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general purpose microprocessor, a graphics processing unit, and so on.

Storage media 28 may be configured to store encoded video data, such as encoded video data (e.g., a bitstream) received by input interface 26. Display device 32 displays the decoded video data to a user. Display device 32 may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 encode and decode video data according to a video coding standard or specification. For example, video encoder 20 and video decoder 30 may encode and decode video data according to ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, or another video coding standard or specification. In some examples, video encoder 20 and video decoder 30 encode and decode video data according to the, High Efficiency Video Coding (HEVC), which as known as or ITU-T H.265, its range and screen content coding extensions, its 3D video coding extension (3D-HEVC), its multiview extension (MV-HEVC), or its scalable extension (SHVC).

In HEVC and other video coding specifications, video data includes a series of pictures. Pictures may also be referred to as "frames." A picture may include one or more sample arrays. Each respective sample array of a picture may comprise an array of samples for a respective color component. A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. In some examples, to encode a block of the picture, video encoder 20 performs intra prediction or inter prediction to generate one or more predictive blocks. Additionally, video encoder 20 may generate residual data for the block. The residual block comprises residual samples. Each residual sample may indicate a difference between a sample of one of the generated predictive blocks and a corresponding sample of the block. Video encoder 20 may apply a transform to blocks of residual samples to generate transform coefficients. Furthermore, video encoder 20 may quantize the transform coefficients. In some examples, video encoder 20 may generate one or more syntax elements to represent a transform coefficient. Video encoder 20 may entropy encode one or more of the syntax elements representing the transform coefficient.

More specifically, when encoding video data according to HEVC or other video coding specifications, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each a CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a PU of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a PU of a current picture, video encoder 20 may generate the predictive block of the PU based on decoded samples of a reference picture (i.e., a picture other than the current picture). In HEVC, video encoder 20 generates a "prediction unit" syntax structure within a "coding_unit" syntax structure for inter predicted PUs, but does not generate a "prediction_unit" syntax structure within a "coding_unit" syntax structure for intra predicted PUs. Rather, in HEVC, syntax elements related to intra predicted PUs are included directly in the "coding_unit" syntax structure.

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 20 may quantize transform coefficients of the coefficient block. Quantization may reduce the bit depth associated with some or all the transform coefficients. For example, an n-bit transform coefficient may be rounded down to an m-bit transform coefficient during quantization, where n is greater than m. In some examples, video encoder 20 skips quantization.

Video encoder 20 may generate syntax elements indicating some or all the potentially quantized transform coefficients. Video encoder 20 may entropy encode one or more of the syntax elements indicating a quantized transform coefficient. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. The encoded representation of the video data may include an encoded representation of pictures of the video data. For example, the bitstream may comprise a sequence of bits that forms a representation of encoded pictures of the video data and associated data. In some examples, a representation of an encoded picture may include encoded representations of blocks of the picture.

In HEVC and other video coding specifications, the bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures.

For instance, as part of decoding a picture of the video data, video decoder 30 may use inter prediction or intra prediction to generate predictive blocks. Additionally, video decoder 30 may determine transform coefficients based on syntax elements obtained from the bitstream. In some examples, video decoder 30 inverse quantizes the determined transform coefficients. Furthermore, video decoder 30 may apply an inverse transform on the determined transform coefficients to determine values of residual samples. Video decoder 30 may reconstruct a block of the picture based on the residual samples and corresponding samples of the generated predictive blocks. For instance, video decoder 30 may add residual samples to corresponding samples of the generated predictive blocks to determine reconstructed samples of the block.

More specifically, in HEVC and other video coding specifications, video decoder 30 may use inter prediction or intra prediction to generate one or more predictive blocks for each PU of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct a coding block of the current CU based on samples of the predictive blocks of the PUs of the current CU and residual samples of the transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

As noted above, a bitstream may include a representation of encoded pictures of the video data and associated data. The associated data may include parameter sets. In HEVC and other video coding specifications, NAL units may encapsulate RBSPs for video parameter sets (VPSs), sequence parameter sets (SPSs), and picture parameter sets (PPSs). A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

HEVC and other video coding standards specify profiles, tiers, and levels. Profiles, tiers, and levels specify restrictions on bitstreams and hence limits on the capabilities needed to decode the bitstreams. Profiles, tiers, and levels may also be used to indicate interoperability points between individual decoder implementations. Each profile specifies a subset of algorithmic features and limits that is supported by all video decoders conforming to that profile. Video encoders are not required to make use of all features supported in a profile.

Each level of a tier may specify a set of limits on the values that syntax elements and variables may have. The same set of tier and level definitions may be used with all profiles, but individual implementations may support a different tier and within a tier a different level for each supported profile. For any given profile, a level of a tier may generally correspond to a particular decoder processing load and memory capability. Capabilities of video decoders may be specified in terms of the ability to decode video streams conforming to the constraints of particular profiles, tiers, and levels. For each such profile, the tier, and level supported for that profile may also be expressed. Some video decoders may not be able to decode particular profiles, tiers, or levels.

In HEVC, profiles, tiers, and levels may be signaled by the syntax structure profile_tier_level( )) syntax structure. The profile_tier_level( )) syntax structure may be included in a VPS and/or a SPS. The profile_tier_level( )) syntax structure may include a general_profile_idc syntax element, a general_tier_flag syntax element, and a general_level_idc syntax element. The general_profile_idc syntax element may indicate a profile to which a CVS conforms. The general_tier_flag syntax element may indicate a tier context for interpretation of the general_level_idc syntax element. The general_level_idc syntax element may indicate a level to which a CVS conforms. Other values for these syntax elements may be reserved.

Capabilities of video decoders may be specified in terms of the ability to decode video streams conforming to the constraints of profiles, tiers, and levels. For each such profile, the tier and level supported for that profile may also be expressed. In some examples, video decoders do not infer that a reserved value of the general_profile_idc syntax element between the values specified in HEVC indicates intermediate capabilities between the specified profiles. However, video decoders may infer that a reserved value of the general_level_idc syntax element associated with a particular value of the general_tier_flag syntax element between the values specified in HEVC indicates intermediate capabilities between the specified levels of the tier.

Encoded video data and/or metadata regarding the encoded video data may be stored in files that conform to various file format standards. Various devices may generate a file for storing encoded video data and/or metadata regarding the encoded video data. For example, source device 12 may generate the file. In this example, output interface 22 may output the file. In the example of FIG. 1, a file generation device 34 receives encoded video data generated by source device 12 and generates a file. Furthermore, in the example of FIG. 1, file generation device 34 includes a memory 36 that is configured to store the encoded video data, the file, and/or other data. File generation device 34 may comprise various types of devices, such as a server device, an intermediate network device, or another type of device. File generation device 34 may comprise an output interface, similar to output interface 22, configured to output the file.

File format standards include the ISO base media file format (ISOBMFF, ISO/IEC 14496-12), and other file formats derived from the ISOBMFF, including MPEG-4 file format (ISO/IEC 14496-15), 3GPP file format (3GPP TS 26.244) and AVC file format (ISO/IEC 14496-15). Although originally designed for storage, the ISOBMFF has proven to be very valuable for streaming, e.g. for progressive download or DASH. For streaming purposes, the movie fragments defined in ISOBMFF can be used.

Draft texts of the new editions for ISO/IEC 14496-12 and 14496-15 are available at http://phenix.int-evey.fr/mpeg/doc_end_user/documents/111_Geneva/wg11/w15177-v6-w15177.zip and
http://phenix.int-evey.fr/mpeg/doc_end_user/documents/112_Warsaw/wg11/w15479-v2-w15479.zip, respectively.

In some examples, the draft texts of the new editions for ISO/IEC 14496-12 and 14496-15 may be referred to below as the "current draft file format specification." The ISOBMFF is used as the basis for many codec encapsulation formats, such as the AVC file format, as well as for many multimedia container formats, such as the MPEG-4 file format, the 3GPP file format (3GP), and the DVB file format.

In addition to continuous media, such as audio and video, static media, such as images, as well as metadata can be stored in a file conforming to ISOBMFF. Files structured according to the ISOBMFF may be used for many purposes, including local media file playback, progressive downloading of a remote file, segments for DASH, containers for content to be streamed and its packetization instructions, and recording of received real-time media streams.

A box is the elementary syntax structure in the ISOBMFF. A box may include a coded box type (e.g., a four-character coded box type), a byte count of the box, and a payload. An ISOBMFF file includes or consists of a sequence of boxes, and boxes may contain other boxes. The ISOBMFF defines various types of boxes. To allow the syntax and semantics of boxes to evolve, a box may include a version syntax element indicating a syntactical and semantical version of the box. For instance, a box with a version syntax element equal to 0 may have a first syntax while a box of the same type with a version syntax element equal to 1 may have a second, different syntax.

The boxes in a file may include a Movie box ("moov") that contains metadata for continuous media streams that are present in the file. Each of the continuous media streams may be represented in the file as a track. For instance, a movie box may contain metadata regarding a movie (e.g., logical and timing relationships between samples, and also pointers to locations of samples). Movie boxes may include several types of sub-boxes. For instance, the sub-boxes in a movie box may include one or more track boxes.

A track box may include information about an individual track of a movie. A track box may include a track header box that specifies overall information of a single track. In addition, a track box may include a media box that contains a media information box. The media information box may include a sample table box that contains data indexing media samples in the track. Information in the sample table box may be used to locate samples in time and, for each of the samples of the track, a type, size, container, and offset into that container of the sample. Thus, the metadata for a track is enclosed in a Track box ("trak"). The media content of a track is either enclosed in a Media Data box ("mdat") or directly in a separate file. The media content for tracks may comprise or consist of a sequence of samples, such as audio or video access units.

Furthermore, the ISOBMFF specifies the following types of tracks: a media track, a hint track, and a timed metadata track. A media track contains an elementary media stream. A hint track either includes media transmission instructions or represents a received packet stream. A timed metadata track comprises time-synchronized metadata.

The metadata for each track includes a list of sample description entries. Each sample description entry provides the coding or encapsulation format used in the track and the initialization data needed for processing that format. Each sample is associated with one of the sample description entries of the track.

The ISOBMFF enables specifying sample-specific metadata with various mechanisms. Specific boxes within the Sample Table box ("stbl") have been standardized to respond to common needs. The Sample Table box contains a sample table that contains all the time and data indexing of the media samples in a track. Using the tables in the Sample Table box, it may be possible to locate samples in time, determine their type (e.g. I-frame or not), and determine their size, container, and offset into that container. For example, a Sync Sample box ("stss") is a box within a Sample Table box. A Sync Sample box ("stss") is used to list the random access samples of the track. This disclosure may refer to a sample listed by the Sync Sample box as a sync sample. The sample grouping mechanism enables mapping of samples according to a four-character grouping type into groups of samples sharing the same property specified as a sample group description entry in the file. Several grouping types have been specified in the ISOBMFF.

A Movie Fragment box is a top-level box. Each Movie Fragment box provides information that would have previously been in the Movie box. A Movie Fragment box may contain one or more track fragment ("traf") boxes. Within the Movie Fragment there is a set of track fragments, zero or more per track. The track fragments in turn contain zero or more track runs, each of which documents a contiguous run of samples for that track. For instance, each track run may contain samples of pictures that are contiguous in a certain order, such as decoding order. A track fragment box is defined in the 14996-12 specification and comprises metadata for one or more track fragments. For instance, a track fragment box may include a track fragment header box indicating a track ID, a base data offset, a sample description index, a default sample duration, a default sample size, and default sample flags. A track fragment box may include one or more track fragment run boxes, each documenting a contiguous set of samples for a track. For instance, a track fragment box may include syntax elements indicating a sample count, a data offset, sample flags, a sample duration, a sample size, sample composition time offset, and so on. Within these structures, many fields are optional and can be defaulted.

A sample grouping is an assignment of each of the samples in a track to be a member of one sample group. Samples in a sample group are not required to be contiguous. Sample groups may be represented by two data structures: a SampleToGroup box and a SampleGroupDescription box.

The SampleToGroup box may also be referred to as a Sample-To-Group box. The SampleGroupDescription box may also be referred to as a Sample Group Description box. The SampleToGroup box represents the assignment of samples to sample groups. A SampleGroupDescription box describes the properties of the corresponding sample group.

A sample table box may include one or more SampleToGroup boxes and one or more sample group description boxes (i.e., SampleGroupDescription boxes). A SampleToGroup box may be used to determine a sample group to which a sample belongs, along with an associated description of the sample group. In other words, a SampleToGroup box may indicate a group to which a sample belongs. A SampleToGroup box may have a box type of "sbgp."

A SampleToGroup box may include a grouping type element (e.g., grouping_type). In some instances, in this disclosure, an element of a box may also be referred to as a syntax element. The grouping_type element may be an integer that identifies a type (i.e., a criterion used to form the sample groups) of a sample grouping. Furthermore, a SampleToGroup box may include one or more entries (i.e., sample group entries). Each sample group entry in a SampleToGroup box may be associated with a different, non-overlapping series of consecutive samples in the track. Each sample group entry may indicate a sample count element (e.g., sample_count) and a group description index element (e.g., group_description_index). The sample count element of a sample group entry may indicate a number of samples associated with the sample group entry. In other words, the sample count element of the sample group entry may be an integer that gives the number of consecutive samples with the same sample group descriptor. The group description index element may identify, within a SampleGroupDescription box, a group description entry that contains a description of the samples associated with the sample group entry. The group description index elements of multiple sample group entries may identify the same SampleGroupDescription box.

Furthermore, a sample table box may include a sample description box that comprises a format description for a stream. In particular, the sample description box may include a list of one or more sample entries. Each of the sample entries may contain a name of a media type (e.g., a type of decoder needed to decode the stream) and any parameterization of that decoder needed. For instance, in the context of HEVC, a sample entry may include an HEVC decoder configuration record. Thus, an HEVC decoder configuration record may be a sub-box of a sample table box. An HEVC decoder configuration record may include decoder configuration information for ISO/IEC 23008-2 (i.e., HEVC) video content. For example, a HEVC decoder configuration record may include one or more NAL units that contain parameter sets (e.g., VPSs, SPS, PPSs, etc.)

ISOBMFF implements a restricted design. The restricted scheme design in ISOBMFF is for handling of situations where the file author requires certain actions on the player or renderer, to enable players to simply inspect a file to find out such requirements for rendering a bitstream and stops legacy players from decoding and rendering files that require further processing. The mechanism applies to any type of video codec.

The mechanism is similar to the content protection transformation where sample entries are hidden behind generic sample entries, 'encv', 'enca', etc., indicating encrypted or encapsulated media. The analogous mechanism for restricted video uses a transformation with the generic sample entry 'resv'. The method may be applied when the content should only be decoded by players that present it correctly.

The method is applied as follows:
1) The four-character-code of the sample entry is replaced by a new sample entry code 'resv' meaning restricted video.
2) A Restricted Scheme Info box is added to the sample description, leaving all other boxes unmodified.
3) The original sample entry type is stored within an Original Format box contained in the Restricted Scheme Info box.

A RestrictedSchemeInfoBox is formatted exactly the same as a ProtectionSchemeInfoBox, except that the RestrictedSchemeInfoBox uses the identifier 'rinf' instead of 'sinf' (see below). The original sample entry type is contained in the Original Format box located in the Restricted Scheme Info box (in an identical way to the Protection Scheme Info box for encrypted media). The exact nature of the restriction is defined in the SchemeTypeBox, and the data needed for that scheme is stored in the SchemeInformationBox, again, analogously to protection information.

The restriction and protection can be applied at the same time. The order of the transformations follows from the four-character code of the sample entry. For instance, if the sample entry type is 'resv', undoing the above transformation may result in a sample entry type 'encv', indicating that the media is protected.

Note that if the file author only wants to provide advisory information without stopping legacy players from playing the file, the Restricted Scheme Info box may be placed inside the sample entry without applying the four-character-code transformation. In this case, it is not necessary to include an Original Format box.

A Restricted Scheme Information Box is defined as follows:
Box Types: 'rinf'
Container: Restricted Sample Entry or Sample Entry
Mandatory: Yes
Quantity: Exactly one The Restricted Scheme Information Box contains all the information required both to understand the restriction scheme applied and its parameters. It also documents the original (un-transformed) sample entry type of the media. The Restricted Scheme Information Box is a container Box. It is mandatory in a sample entry that uses a code indicating a restricted stream, i.e., 'resv'.

When used in a restricted sample entry, this box must contain the original format box to document the original sample entry type and a Scheme type box. A Scheme Information box may be required depending on the restriction scheme.

```
aligned(8) class RestrictedSchemeInfoBox(fmt) extends Box('rinf') {
    OriginalFormatBox(fmt)      original_format;
    SchemeTypeBox               scheme_type_box;
    SchemeInformationBox        info;   // optional
}
```

A Scheme Type Box is defined as follows:
Box Types: 'schm'
Container: Protection Scheme Information Box ('sinf'), Restricted Scheme
Information Box ('rinf'), or SRTP Process box ('srpp')
Mandatory: No
Quantity: Zero or one in 'sinf', depending on the protection structure;
Exactly one in 'rinf' and 'srpp'
The Scheme Type Box ('schm') identifies the protection or restriction scheme.

```
aligned(8) class SchemeTypeBox extends FullBox('schm', 0, flags) {
    unsigned int(32)    scheme_type; // 4CC identifying the scheme
    unsigned int(32)    scheme_version;// scheme version
    if (flags & 0x000001) {
        unsigned int(8)    scheme_uri[ ]; l// browser uri
    }
}
``` scheme_type is the code defining the protection or restriction scheme.

scheme_version is the version of the scheme (used to create the content)

scheme_URI allows for the option of directing the user to a web-page if they do not have the scheme installed on their system. It is an absolute URI formed as a null-terminated string in UTF-8 characters.

A Scheme Information Box is defined as follows:
Box Types: 'schi'
Container: Protection Scheme Information Box ('sinf'), Restricted Scheme
Information Box (lie), or SRTP Process box ('srpp')
Mandatory: No
Quantity: Zero or one The Scheme Information Box is a container Box that is only interpreted by the scheme being used. Any information the encryption or restriction system needs is stored here. The content of this box is a series of boxes whose type and format are defined by the scheme declared in the Scheme Type Box.

```
aligned(8) class SchemeInformationBox extends Box('schi') {
    Box    scheme_specific_data[ ];
}
```

DASH, specified in ISO/IEC 23009-1, is a standard for HTTP (adaptive) streaming applications. It mainly specifies the format of the MPD, also known as manifest, and the media segment format. The MPD describes the media available on the server and lets the DASH client to autonomously download the media version at the media time it is interested in.

A typical procedure for DASH based HTTP streaming includes several steps. First, a client obtains the MPD of a streaming content, e.g. a movie. The MPD includes information on different alternative representations, e.g., bit rate, video resolution, frame rate, audio language, of the streaming content, as well as the URLs of the HTTP resources (the initialization segment and the media segments). Second, based on information in the MPD and the client's local information, e.g., network bandwidth, decoding/display capabilities and user preference, the client requests the desired representation(s), one segment (or a part thereof) at a time. Third, when the client detects a network bandwidth change, it requests segments of a different representation with a better-matching bitrate, ideally starting from a segment that starts with a random access point.

During an HTTP streaming "session," to respond to the user request to seek backward to a past position or forward to a future position, the client requests past or future segments starting from a segment that is close to the desired position and that ideally starts with a random access point. The user may also request to fast-forward the content, which may be realized by requesting data sufficiently for decoding only the intra-coded video pictures or only a temporal subset of the video stream.

VR generally refers to the ability to be virtually present in a non-physical world created by the rendering of natural and/or synthetic image and sound correlated by the movements of the immersed user allowing to interact with that world. With the recent progress made in rendering devices, such as head mounted displays (HMD), and VR video (often also referred to as 360 degree video) creation, a significant quality of experience can be offered. VR applications including gaming, training, education, sports video, online shopping, entertainment, and so on.

A typical VR system typically consists of the following components and steps:

1) A camera set, which typically consists of multiple individual cameras pointing to different directions and ideally collectively covering all viewpoints around the camera set.
2) Image stitching, where video pictures taken by the multiple individual cameras are synchronized in the time domain and stitched in the space domain, to be a spherical video, but mapped to a rectangular format, such as equi-rectangular (like a world map) or cube map.
3) The video in the mapped rectangular format is encoded/compressed using a video codec, e.g., H.265/HEVC or H.264/AVC.
4) The compressed video bitstream(s) may be stored and/or encapsulated in a media format and transmitted (possibly only the subset covering only the area being seen by a user) through a network to a receiver.
5) The receiver receives the video bitstream(s) or part thereof, possibly encapsulated in a format, and sends the decoded video signal or part thereof to a rendering device.
6) The rendering device can be e.g., an HMD, which can track head movement and even eye move moment and rendering the corresponding part of the video such that an immersive experience is delivered to the user.

Currently, the Omnidirectional Media Application Format (OMAF) is being developed by MPEG to define a media application format that enables omnidirectional media applications, focusing on VR applications with 360° video and associated audio. OMAF specifies a list of projection methods that can be used for conversion of a spherical or 360° video into a two-dimensional rectangular video OMAF also specifies how to store omnidirectional media and the associated metadata using the ISOBMFF and how to encapsulate, signal, and stream omnidirectional media using DASH. OMAF also specifies which video and audio codecs, as well as media coding configurations, that can be used for compression and playback of the omnidirectional media signal. OMAF will become ISO/IEC 23000-20, and latest OMAF draft specification is available at:
http://wg11.sc29.org/doc_end_user/documents/116_Chengdu/wg11/w16439.zip.

HDR and WCG video are being widely deployed today. The rendering of an HDR/WCG video content coded using today's video codecs such as AVC and HEVC needs to be to apply certain post-decoding processes and possibly also display adaptation, see for example Edouard Francois et al., "Signalling, Backward Compatibility and Display Adaptation for HDR/WCG Video Coding, Draft 1," Joint Collaborative Team on Video Coding (JCT-VC) of ITU-T SG 16 WP 3 and ISO/IEC JTC 1/SC 29/WG 11, 25th Meeting, Chengdu, CH, 14-21 Oct. 2016, document JCTVC-Y1017-v2, (hereinafter, JCTVC-Y1012") available from (http://phenix.int-evry.fr/jct/doc_end_user/documents/25_Chengdu/wg11/JCTVC-Y1012-v2.zip) and Jonatan Samuelsson et al., "Conversion and Coding Practices for HDR/WCG Y'CbCr 4:2:0 Video with PQ Transfer Characteristics (Draft 3), Joint Collaborative Team on Video Coding (JCT-VC) of ITU-T SG 16 WP 3 and ISO/IEC JTC 1/SC 29/WG 11, 25$^{th}$ Meeting, Chengdu, 14-21 Oct. 2016, document JCTVC-Y1017, available from http://phenix.int-evry.fr/jct/doc_end_user/documents/25_Chengdu/wg11/JCTVC-Y1017-v1.zip.

Syntax elements of Video Usability Information (VUI) of HEVC can be used to convey the metadata describing important HDR/WCG information attributes. Examples of VUI parameters relevant to HDR/WCG video system design include colour primaries, transfer characteristics and matrix coefficients specified in Tables E.3, E.4 and E.5 of the HEVC specification respectively. A transfer function is indicated using transfer_characteristics syntax element. transfer_characteristics indicates the opto-electronic transfer characteristic of the source picture as specified in Table E.4 as a function of a linear optical intensity input Lc with a nominal real-valued range of 0 to 1. For interpretation of entries in Table E.4 that are expressed in terms of multiple curve segments parameterized by the variable α over a region bounded by the variable β or by the variables β and γ, the values of α and β are defined to be the positive constants necessary for the curve segments that meet at the value β to have continuity of value and continuity of slope at the value β, and the value of γ, when applicable, is defined to be the positive constant necessary for the associated curve segments to meet at the value γ. For example, for transfer_characteristics equal to 1, 6, 14 or 15, α has the value 1+5.5*R=1.099 296 826 809 442 . . . and β has the value 0.018 053 968 510 807 . . . .

RGB colour primaries are indicated using colour_primaries syntax element. colour_primaries indicates the chromaticity coordinates of the source primaries as specified in Table E.3 in terms of the CIE 1931 definition of x and y as specified in ISO 11664-1.

Colour representation is indicated using matrix_coeffs syntax element. matrix_coeffs describes the matrix coefficients used in deriving luma and chroma signals from the green, blue and red or Y, Z and X primaries, as specified in Table E.5. These information is important for a streaming client to determine whether it can appropriately playback/render a video content or a piece of it, thus decide whether to reject or select/accept/request the content.

Tables E.3, E.4, and E.5 of the HEVC specification are reproduced below:

TABLE E-3

| Value | Primaries | | | Informative Remark |
|---|---|---|---|---|
| | Colour primaries | | | |
| 0 | Reserved | | | For future use by ITU-T\|ISO/IEC |
| 1 | primary | x | y | Rec. ITU-R BT.709-5 |
| | green | 0.300 | 0.600 | Rec. ITU-R BT.1361 conventional colour |
| | blue | 0.150 | 0.060 | gamut system and extended colour gamut |
| | red | 0.640 | 0.330 | system |
| | white D65 | 0.3127 | 0.3290 | IEC 61966-2-1 (sRGB or sYCC) |
| | | | | IEC 61966-2-4 |
| | | | | Society of Motion Picture and Television |
| | | | | Engineers RP 177 (1993) Annex B |
| 2 | Unspecified | | | Image characteristics are unknown or are |
| | | | | determined by the application. |
| 3 | Reserved | | | For future use by ITU-T\|ISO/IEC |
| 4 | primary | x | y | Rec. ITU-R BT.470-6 System M (historical) |
| | green | 0.21 | 0.71 | United States National Television System |
| | blue | 0.14 | 0.08 | Committee 1953 Recommendation for |
| | red | 0.67 | 0.33 | transmission standards for colour television |
| | white C | 0.310 | 0.316 | United States Federal Communications |
| | | | | Commission Title 47 Code of Federal |
| | | | | Regulations (2003) 73.682 (a) (20) |
| 5 | primary | x | y | Rec. ITU-R BT.470-6 System B, G |
| | green | 0.29 | 0.60 | (historical) |
| | blue | 0.15 | 0.06 | Rec. ITU-R BT.601-6 625 |
| | red | 0.64 | 0.33 | Rec. ITU-R BT.1358 625 |
| | white D65 | 0.3127 | 0.3290 | Rec. ITU-R BT.1700 625 PAL and 625 |
| | | | | SECAM |
| 6 | primary | x | y | Rec. ITU-R BT.601-6 525 |
| | green | 0.310 | 0.595 | Rec. ITU-R BT.1358 525 |
| | blue | 0.155 | 0.070 | Rec. ITU-R BT.1700 NTSC |
| | red | 0.630 | 0.340 | Society of Motion Picture and Television |
| | white D65 | 0.3127 | 0.3290 | Engineers 170M (2004) |
| | | | | (functionally the same as the value 7) |
| 7 | primary | x | y | Society of Motion Picture and Television |
| | green | 0.310 | 0.595 | Engineers 240M (1999) |
| | blue | 0.155 | 0.070 | (functionally the same as the value 6) |
| | red | 0.630 | 0.340 | |
| | white D65 | 0.3127 | 0.3290 | |
| 8 | primary | x | y | Generic film (colour filters using Illuminant |
| | green | 0.243 | 0.692 (Wratten 58) | C) |
| | blue | 0.145 | 0.049 (Wratten 47) | |
| | red | 0.681 | 0.319 (Wratten 25) | |
| | white C | 0.310 | 0.316 | |

TABLE E-3-continued

Colour primaries

| Value | Primaries | | | Informative Remark |
|---|---|---|---|---|
| 9 | primary | x | y | Rec. ITU-R BT.2020 |
|   | green | 0.170 | 0.797 | |
|   | blue | 0.131 | 0.046 | |
|   | red | 0.708 | 0.292 | |
|   | white D65 | 0.3127 | 0.3290 | |
| 10 ... 255 | Reserved | | | For future use by ITU-T|ISO/IEC |

TABLE E-4

Transfer characteristics

| Value | Transfer Characteristic | | Informative Remark |
|---|---|---|---|
| 0 | Reserved | | For future use by ITU-T| ISO/IEC |
| 1 | $V = \alpha * L_c^{0.45} - (\alpha - 1)$ | for $1 >= L_c >= \beta$ | Rec. ITU-R BT.709-5 |
|   | $V = 4.500 * L_c$ | for $\beta > L_c >= 0$ | Rec. ITU-R BT.1361 conventional colour gamut system (functionally the same as the values 6, 14, and 15) |
| 2 | Unspecified | | Image characteristics are unknown or are determined by the application. |
| 3 | Reserved | | For future use by ITU-T| ISO/IEC |
| 4 | Assumed display gamma 2.2 | | Rec. ITU-R BT.470-6 System M (historical) United States National Television System Committee 1953 Recommendation for transmission standards for colour television United States Federal Communications Commission Title 47 Code of Federal Regulations (2003) 73.682 (a) (20) Rec. ITU-R BT.1700 (2007 revision) 625 PAL and 625 SECAM |
| 5 | Assumed display gamma 2.8 | | Rec. ITU-R BT.470-6 System B, G (historical) |
| 6 | $V = \alpha * L_c^{0.45} - (\alpha - 1)$ | for $1 >= L_c >= \beta$ | Rec. ITU-R BT.601-6 525 or 625 |
|   | $V = 4.500 * L_c$ | for $\beta > L_c >= 0$ | Rec. ITU-R BT.1358 525 or 625 Rec. ITU-R BT.1700 NTSC Society of Motion Picture and Television Engineers 170M (2004) (functionally the same as the values 1, 14, and 15) |
| 7 | $V = \alpha * L_c^{0.45} - (\alpha - 1)$ | for $1 >= L_c >= \beta$ | Society of Motion Picture and Television Engineers 240M (1999) |
|   | $V = 4.0 * L_c$ | for $\beta > L_c >= 0$ | |
| 8 | $V = L_c$ | for $1 > L_c >= 0$ | Linear transfer characteristics |
| 9 | $V = 1.0 + Log10(L_c) \div 2$ | for $1 >= L_c >= 0.01$ | Logarithmic transfer |
|   | $V = 0.0$ | for $0.01 > L_c >= 0$ | characteristic (100:1 range) |
| 10 | $V = 1.0 + Log10(L_c) \div 2.5$ | for $1 >= L_c >=$ Sqrt(10) $\div$ 1000 | Logarithmic transfer characteristic |
|   | $V = 0.0$ | for Sqrt(10) $\div$ 1000 $> L_c >= 0$ | (100 * Sqrt(10):1 range) |
| 11 | $V = \alpha * L_c^{0.45} - (\alpha - 1)$ | for $L_c >= \beta$ | IEC 61966-2-4 |
|   | $V = 4.500 * L_c$ | for $\beta > L_c > -\beta$ | |
|   | $V = -\alpha * (-L_c)^{0.45} + (\alpha - 1)$ | for $-\beta >= L_c$ | |
| 12 | $V = \alpha * L_c^{0.45} - (\alpha - 1)$ | for $1.33 > L_c >= \beta$ | Rec. ITU-R BT.1361 extended colour gamut system |
|   | $V = 4.500 * L_c$ | for $\beta > L_c >= -\gamma$ | |
|   | $V = -(\alpha * (-4 * L_c)^{0.45} - (\alpha - 1)) \div 4$ | for $-\gamma > L_c >= -0.25$ | |
| 13 | $V = \alpha * L_c^{(1 \div 2.4)} - (\alpha - 1)$ | for $1 >= L_c >= \beta$ | IEC 61966-2-1 (sRGB or sYCC) |
|   | $V = 12.92 * L_c$ | for $\beta > L_c >= 0$ | |

TABLE E-4-continued

Transfer characteristics

| Value | Transfer Characteristic | | Informative Remark |
|---|---|---|---|
| 14 | $V = \alpha * L_c^{0.45} - (\alpha - 1)$ <br> $V = 4.500 * L_c$ | for $1 >= L_c >= \beta$ <br> for $\beta > L_c >= 0$ | Rec. ITU-R BT.2020 (functionally the same as the values 1, 6, and 15) |
| 15 | $V = \alpha * L_c^{0.45} - (\alpha - 1)$ <br> $V = 4.500 * L_c$ | for $1 >= L_c >= \beta$ <br> for $\beta > L_c >= 0$ | Rec. ITU-R BT.2020 (functionally the same as the values 1, 6, and 14) |
| 16 | $V = ((c1 + c2 * Lcn) \div (1 + c3 * Lcn))m$ for all values of Lc <br> $c1 = c3 - c2 + 1 = 3424 \div 4096 = 0.8359375$ <br> $c2 = 32 * 2413 \div 4096 = 18.8515625$ <br> $c3 = 32 * 2392 \div 4096 = 18.6875$ <br> $m = 128 * 2523 \div 4096 = 78.84375$ <br> $n = 0.25 * 2610 \div 4096 = 0.1593017578125$ <br> for which Lc equal to 1 for peak white is ordinarily intended to correspond to a display luminance level of 10 000 candelas per square meter | | SMPTE ST 2084 for 10, 12, 14 and 16-bit systems. |
| 17 | $V = (48 * Lc \div 52.37)(1 \square 2.6)$ for all values of Lc <br> for which Lc equal to 1 for peak white is ordinarily intended to correspond to a display luminance level of 48 candelas per square meter | | SMPTE ST 428-1 |
| 18 ... 255 | Reserved | | For future use by ITU-T\|ISO/IEC |

TABLE E-5

Matrix coefficients

| Value | Matrix | Informative remark |
|---|---|---|
| 0 | Identity | The identity matrix. <br> Typically used for GBR (often referred to as RGB); however, may also be used for YZX (often referred to as XYZ); see Equations E-19 to E-21 <br> IEC 61966-2-1 (sRGB) <br> SMPTE ST 428-1 |
| 1 | $K_R = 0.2126; K_B = 0.0722$ | ITU-R Rec. BT.709-5 <br> ITU-R Rec. BT.1361 conventional colour gamut system and extended colour gamut system <br> IEC 61966-2-1 (sYCC) <br> IEC 61966-2-4 xvYCC$_{709}$ <br> Society of Motion Picture and Television Engineers RP 177 (1993) Annex B |
| 2 | Unspecified | Image characteristics are unknown or are determined by the application. |
| 3 | Reserved | For future use by ITU-T\|ISO/IEC |
| 4 | $K_R = 0.30; K_B = 0.11$ | United States Federal Communications Commission Title 47 Code of Federal Regulations (2003) 73.682 (a) (20) |
| 5 | $K_R = 0.299; K_B = 0.114$ | ITU-R Rec. BT.470-6 System B, G (historical) <br> ITU-R Rec. BT.601-6 625 <br> ITU-R Rec. BT.1358 625 <br> ITU-R Rec. BT.1700 625 PAL and 625 SECAM <br> IEC 61966-2-4 xvYCC$_{601}$ <br> (functionally the same as the value 6) |
| 6 | $K_R = 0.299; K_B = 0.114$ | ITU-R Rec. BT.601-6 525 <br> ITU-R Rec. BT.1358 525 <br> ITU-R Rec. BT.1700 NTSC <br> Society of Motion Picture and Television Engineers 170M (2004) <br> (functionally the same as the value 5) |
| 7 | $K_R = 0.212; K_B = 0.087$ | Society of Motion Picture and Television Engineers 240M (1999) |
| 8 | YCgCo | See Equations E-22 to E-36 |
| 9 | $K_R = 0.2627; K_B = 0.0593$ | Rec. ITU-R BT.2020 non-constant luminance system <br> See Equations E-16 to E-18 |
| 10 | $K_R = 0.2627; K_B = 0.0593$ | Rec. ITU-R BT.2020 constant luminance system <br> See Equations E-37 to E-46 |
| 11 ... 255 | Reserved | For future use by ITU-T\|ISO/IEC |

In addition, certain information attributes in HDR and others contain static information (holds for a sequence of access units and may be used for selection) and dynamic information that changes for example with every access unit. The static information needs to be summarized in order to enable selection and configuration.

The sample entry of a video track and the codecs parameter may contain important information such as video codec, the profile and level of the bitstream. This information is also important for a streaming client to determine whether the streaming client can appropriately playback/render a video content or a piece of it, thus decide whether to reject or select/accept/request the content. In the example of FIG. 1, destination device 14 may comprise a streaming client. A benefit of having important video information in the sample entry and/or the codecs parameter is that the important video information can be easily exposed to and accessed by application clients, such as DASH clients, to make content rejection/selection/accepting/requesting decisions. In the example of FIG. 1, destination device 14 may comprise an application client.

However, in existing designs of file formats, important HDR/WCG information such as mentioned above, as well as information on the presence of essential SEI messages, is not included in the sample entry or codecs parameter to be easily exposed to and accessed by application terminals. Such essential SEI messages may be present in the bitstream and their proper handling may be required when rendering the content for good user experience. In some examples, "essential SEI messages" are SEI messages that are required for rendering content such that the rendered content meets or exceeds one or more quality criteria (e.g., dynamic range, color gamut, frame rate, pixel count, etc.). Also, there is no mechanism for signaling of important information for VR content such as projection and region-wise packing in the codecs parameter.

Information may be included in the decoder configuration record, but this may be interleaved with specific NAL units or may be buried with other information. In addition, only the first 6 bytes of the decoder configuration record can be exposed to the sample entry and Internet Media type parameter which limits the applicability as well.

A media type (i.e., a MIME type) is composed of a type, a subtype, and optional parameters. Media type consists of top-level type name and sub-type name, which is further structured into so-called "trees". Media types can optionally define companion data, known as parameters. The parameters may include a codecs parameter. As indicated in Gellens, et al., "The 'Codecs' and 'Profiles' Parameters for "Bucket" Media Types," RFC 6381, ISSN 2070-1721, August 2011, (hereinafter "RFC 6381"), the codecs parameter is designed to allow unambiguous specification of all codecs indicated to render the content in the MIME part. Furthermore, as defined in RFC 6381, the codecs parameter is a single value, or a comma-separated list of values identifying the codec(s) indicated to render the content in the body part. Each value consists of one or more dot-separated elements. The name space for the first element is determined by the MIME type. The name space for each subsequent element is determined by the preceding element.

As defined in § E.2 of ISO-IEC 14496-15, when the first element of a value is a code indicating a codec from the Advanced Video Coding specification (ISO/IEC 14496-10), as documented in clauses 5, 6 or 7, such as 'avc1', 'avc2', 'avc3', 'avc4', 'svc1', 'svc2', 'mvc1', 'mvc2', 'mvc3', and 'mvc4')—indicating AVC (H.264), Scalable Video Coding (SVC) or Multiview Video Coding (MVC), the second element (referred to as 'avcoti' in the formal syntax) is the hexadecimal representation of the following three bytes in the (subset) sequence parameter set NAL unit specified in ISO/IEC 14496-10:
  profile_idc
  the byte containing the constraint set flags (currently constraint_set0_flag through t_set5_flag, and the reserved_zero_2bits)
  level_idc
The sample entries 'avc1', 'avc2', 'avc3', and 'avc4' do not necessarily indicate that the media only contains AVC NAL units. In fact, the media may be encoded as an SVC or MVC profile and thus contain SVC or MVC NAL units. In order to be able to determine which codec is used, further information is necessary (profile_idc). Note also that reserved_zero_2bits is required to be equal to 0 in ISO/IEC 14496-10, but other values for it may be specified in the future by ITU-T|ISO/IEC.

When SVC or MVC content is coded in an AVC-compatible fashion, the sample description may include both an AVC configuration record and an SVC or MVC configuration record. Under those circumstances, it is recommended that the two configuration records both be reported as they may contain different AVC profile, level, and compatibility indicator values. Thus, the codecs reported would include the sample description code (e.g. 'avc1') twice, with the values from one of the configuration records forming the 'avcoti' information in each.

Note—This section is a superset of the text in RFC 6381, which is as previously defined in the 3GPP File Format specification 3GPP TS 26.244, section A.2.2. If sample entries 'avc3', 'avc4', 'svc2', 'mvc3' and 'mvc4' were not included, the section would be identical to the text in RFC 6381.

The relevant BNF syntax in RFC 6381 is as follows:
iso-avc:=avc1/avc2/svc1/mvc1/mvc2 ["." avcoti] avc1:=%x61.76.63.31; 'avc1' avc2:= %x61.76.63.32; 'avc2' svc1:=%x73.76.63.31; 'svc1' mvc1:=%x6d.76.63.31; 'mvc1' mvc2:=%x6d.76.63.32; 'mvc2' avcoti:=6(DIGIT/"A" /"B" /"C" /"D" /"E" /"F"); leading "Ox" omitted As defined in § E.3 of ISO-IEC 14496-15, when the first element of a value is a code indicating a codec from the High Efficiency Video Coding specification (ISO/IEC 23008-2), as documented in clause 8 (such as 'hev1' or 'hvc1'), the elements following are a series of values from the HEVC decoder configuration record, separated by period characters ("."). In all numeric encodings, leading zeroes may be omitted,
  the general_profile space, encoded as no character (general_profile_space=0), or 'A', 'B', 'C' for general_profile_profile space 1, 2, 3, followed by the general_profile_id encoded as a decimal number;
  the 32 bits of the general_profile_compatibility_flags, but in reverse bit order, i.e. with general_profile_compatibility_flag[31] as the most significant bit, followed by, general_profile_compatibility_flag[30], and down to general_profile_compatibility_flag[0] as the least significant bit, where general_profile_compatibility_flag [i] for i in the range of 0 to 31, inclusive, are specified in ISO/IEC 23008-2, encoded in hexadecimal (leading zeroes may be omitted);
  the general_tier_flag, encoded as 'L' (general_tier_flag=0) or 'H' (general_tier_flag=1), followed by the general_level_idc, encoded as a decimal number;
  each of the 6 bytes of the constraint flags, starting from the byte containing the general_progressive_source_flag, each encoded as a hexadecimal number, and the encoding of each byte separated by a period; trailing bytes that are zero may be omitted.

This disclosure describes several techniques for signaling of important video information related to HDR/WCG, as well as virtual reality in file formats. One or more of these techniques may be applied independently, or in combination with others. In the context of this document, important video information may refer to video information that may be used for content selection, e.g., selection of a video track or a part thereof for consumption.

The techniques of this disclosure generally adhere to the following design principles. Firstly, important video information may be signalled in a container file, e.g., an ISOBMFF file, in a manner that is easily accessible, including a location that is easily found (e.g., in a header or sample entry) and easily parsed (e.g., using fixed length coding instead of entropy coding). Secondly, all pieces of important video information may be easily aggregated to be imposed to higher level systems, e.g., to be aggregated and included in the MIME type or codecs parameter for easy access and inclusion in a DASH MPD. Thirdly, preferably, but not strictly required, important video information that is needed for video decoding and playback should be included in the decoder configuration, which is contained in a sample entry structure.

For the file formats of the existing AVC family of codecs (as specified in clauses 5, 6, and 7 of ISO/IEC 14496-15) and the existing HEVC family of codecs (as specified in clauses 8 and 9 of ISO/IEC 14496-15) to be backward compatible, the HDR/WCG related important video information, i.e., the three 8-bit syntax elements colour_primaries, transfer_characteristics, and matrix_coeffs, is included in a new box, e.g., named ColourDescriptionBox, and this new box is included at the end of the decoder configuration boxes (i.e., AVCConfigurationBox, SVCConfigurationBox, MVCConfigurationBox, MVCDConfigurationBox, A3DConfigurationBox, HEVCConfigurationBox, and LHEVCConfigurationBox). Similarly, a list of types of the essential SEI messages is included in another new type of box, and this new box is included after the ColourDescriptionBox in the decoder configuration boxes.

In some examples, the new box in the sample entry structures (i.e., AVCSampleEntry, AVC2SampleEntry, AVCSVCSampleEntry, AVC2SVCSampleEntry, SVCSampleEntry, AVCMVCSampleEntry, AVC2MVCSampleEntry, MVCSampleEntry, MVCDSampleEntry, A3DSampleEntry, HEVCSampleEntry, HEVCLHVCSampleEntry, and LHEVCSampleEntry) may be included after the decoder configuration box. Similarly, the list of types of the essential SEI messages is included in another new box, and this new box is included after the ColourDescriptionBox in the sample entry structures.

In some examples, the restricted scheme mechanism may be used to include important HDR/WCG information in the sample entry. For example, a new Scheme Type (scheme_type) is defined specifically for HDR/WCG, e.g., named 'hdr', and indications of important HDR/WCG information such as described above are signaled in the SchemeInformationBox, e.g., through a new box to specifically contain the important HDR/WCG information.

Similarly, important video information for VR or 360-degree video content, such as the projection type, the region-wise packing type, and the stereo type, may also be included in a new box and the new box is included into the decoder configuration boxes or the sample entry structures, or use the restricted scheme mechanism, as described above for the HDR related information.

For a new file format of a video codec, e.g., a new/future video codec, since there is no need to consider backward compatibility, important video information such as those for HDR/WCG, VR/360-degree video, and frame packing, as well as the list of types of the essential SEI messages, may be directly included in the decoder configuration record structure. Examples of existing decoder configuration record structure include AVCDecoderConfigurationRecord and HEVCDecoderConfigurationRecord as specified in clauses 5 and 8, respectively, of ISO/IEC 14496-15, preferably immediately after the profile/tier/level syntax elements and before the arrays of parameter sets and SEI NAL units.

To be extensible, a certain number of bits or bytes may be reserved, or include a value that indicates the length of important video information at the beginning of the decoder configuration record structure and make all bits after existing specified fields for important video information within the range reserved, such that in a future version of the file format specification, new fields within the range may be specified for signalling other important video information.

The entire set of important video information may be an array, with the first array indicating a first set of profile/tier/level, HDR/WCG related information, VR/360 video related information, the list of types of the essential SEI messages, . . . ; the second array indicating a second set of profile/tier/level, HDR/WCG related information, VR/360 video related information, the list of types of the essential SEI messages, . . . ; and so on.

With the above designs, it may be, for example, possible to simply copy certain bytes of data at the beginning of the decoder configuration record structure into different fields of the codecs parameter, which then can be easily exposed to higher systems levels such as in a DASH MPD. The decoder configuration record structure is a syntax structure that contains the most important information of a video bitstream that a video decoder needs to know to configure itself for decoding the video bitstream.

The codecs parameter for the AVC family of codecs: the second element (referred to as 'avcoti' in the formal syntax) of the codecs parameter is the hexadecimal representation of the following six bytes in the (subset) sequence parameter set NAL unit specified in ISO/IEC 14496-10: profile_idc, the byte containing the constraint set flags (currently constraint_set0_flag through constraint_set5_flag, and the reserved_zero_2bits), level_idc, colour_primaries, transfer_characteristics, and matrix_coeffs. In some examples, important video information on VR/360 video, as well as frame packing, may also be included in a similar manner.

In some examples, for the codecs parameter for the AVC family of codecs, the three bytes of HDR/WCG important information are added immediately after the profile and level information, and the list of types of the essential SEI messages are added immediately after the three bytes of HDR/WCG important information. In other words, the second element (referred to as 'avcoti' in the formal syntax) of the codecs parameter is changed to be the hexadecimal representation of the following six bytes in the (subset) sequence parameter set NAL unit specified in ISO/IEC 14496-10:
   profile_idc
   the byte containing the constraint set flags (currently constraint_set0_flag through constraint_set5_flag, and the reserved_zero_2bits)
   level_idc
   colour_primaries
   transfer_characteristics
   matrix_coeffs
Followed by the hexadecimal representation of the following:
   a byte that is equal to the number of essential SEI message types
   the array of essential SEI message types, one byte each Alternatively, important video information on VR/360 video as well as frame packing may also be included in a similar manner.

The codecs parameter for the HEVC family of codecs: after each instance of the representation of the 6 bytes of the constraint flags, add a period character (".") and "cdr" (denoting Colour and Dynamic Range) and the hexadecimal representation of the following three bytes in the (subset) sequence parameter set NAL unit specified in ISO/IEC 23008-2: colour_primaries, transfer_characteristics, and matrix_coeffs. Furthermore, after that, add another period character (".") and "esei" (denoting Essential SEI) and the hexadecimal representation of the array of essential SEI message types, one byte each. Alternatively, important video information on VR/360 video as well as frame packing may also be included in a similar manner.

A codecs parameter, possibly in conjunction with a profiles parameter, may be used with various MIME types or type/subtype combinations to allow for unambiguous specification of the codecs employed by the media formats contained within, or the profile(s) of the overall container format. A codecs parameter for future codecs may, for example, include the entire set of important video information as described above, in the following form:

sampleEntryName.ivi_1+ivi_2 . . . +ivi_N
where sampleEntryName is the 4 character code of the sample entry name, and ivi_i is the i-th element of the array of important video information, and can be for example represented using a syntax that is similar to the syntax of the codecs parameter for the AVC or HEVC family of codecs, as described above, excluding the prefixing sample entry name and the first period character (".").

Figure 2:
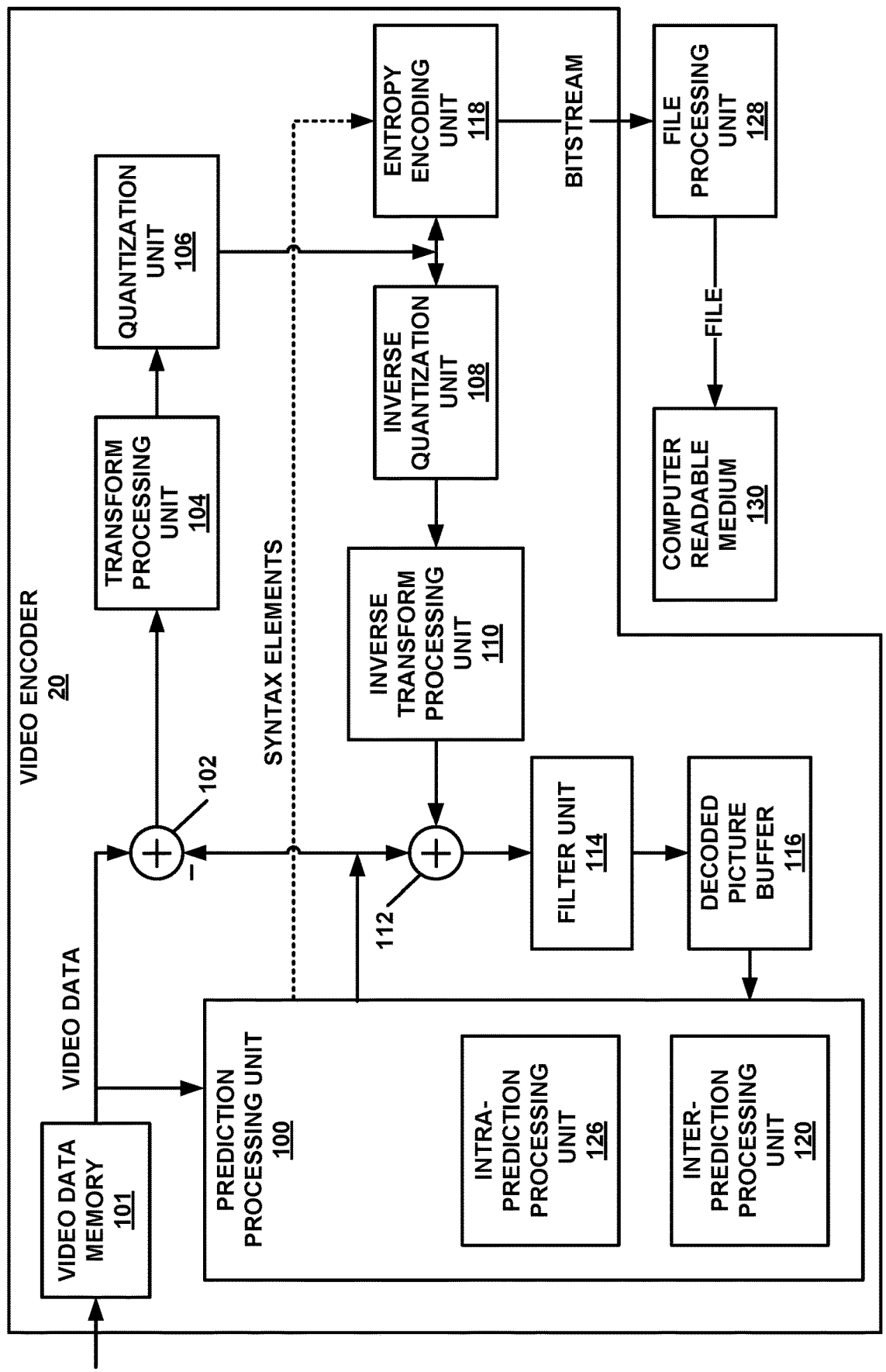
FIG. 2 is a block diagram illustrating an example video encoder that may implement one or more techniques described in this disclosure.
Figure 3:
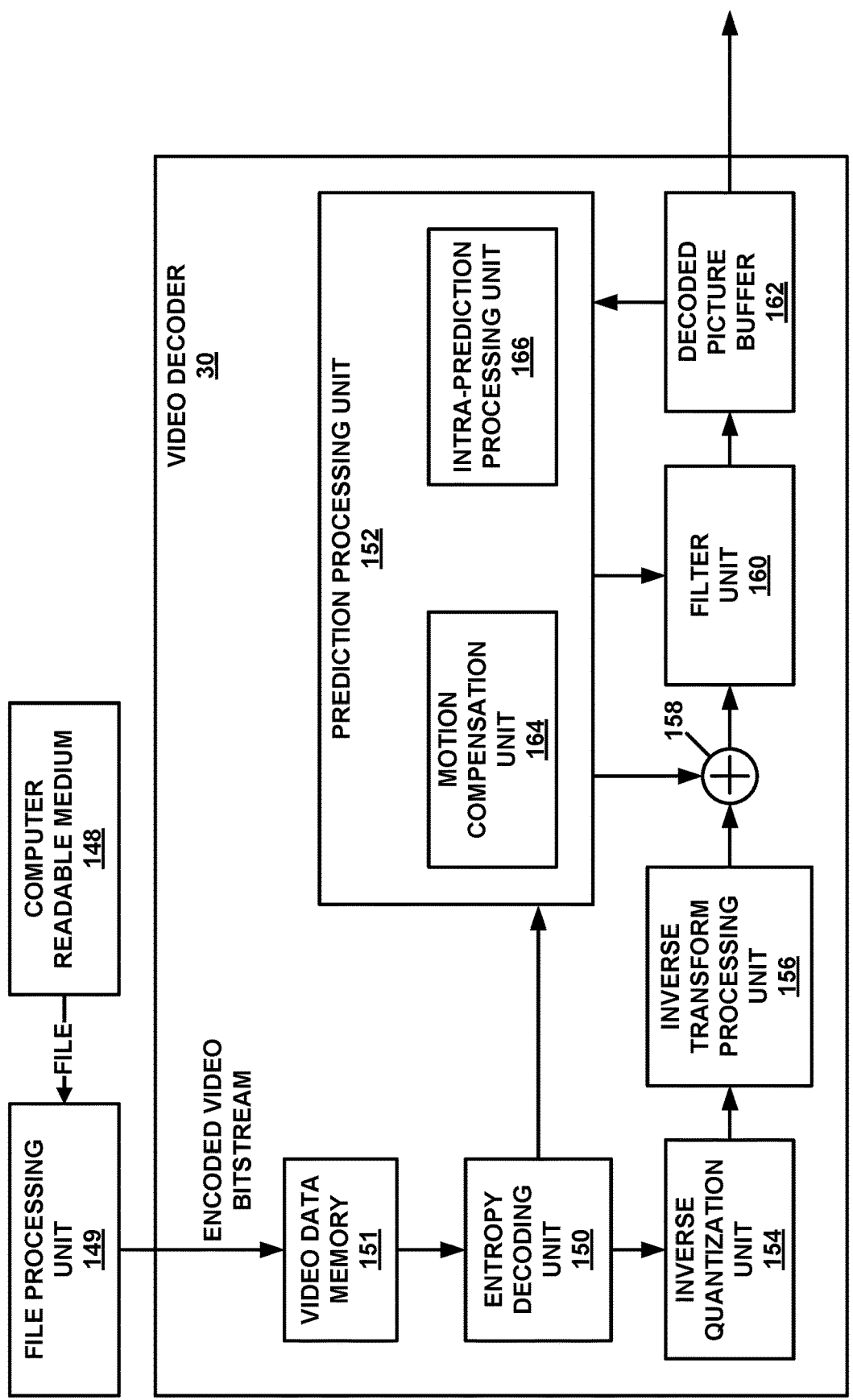
FIG. 3 is a block diagram illustrating an example video decoder that may implement one or more techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. The techniques of this disclosure may be applicable to various coding standards or methods. Although FIG. 2 and FIG. 3 are described in part using HEVC terminology, FIG. 2 and FIG. 3 may be applicable to other video coding specifications, such as H.264/AVC and future video coding specifications.

Processing circuitry includes video encoder 20, and video encoder 20 is configured to perform one or more of the example techniques described in this disclosure. For instance, video encoder 20 includes integrated circuitry, and the various units illustrated in FIG. 2 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 2 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 2, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU. As part of generating the predictive data for a PU, inter-prediction processing unit 120 performs inter prediction on the PU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform partition the residual blocks of a CU into transform blocks of TUs of the CU. For instance, transform processing unit 104 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU.

Furthermore, in the example of FIG. 2, a file processing unit 128 may obtain the bitstream generated by video encoder 20. File processing unit 128 may be implemented by one or more processors of a device, such as source device 12, file generation device 34, a content delivery network device, or another type of device. File processing unit 128 may generate a file that stores the bitstream generated by video encoder 20. Additionally, file processing unit 128 may output the file. For instance, file processing unit 128 may output the file using a wired or wireless network interface, output the file using an interconnect to a device that communicates with a computer readable medium, or output the file in another way. In the example of FIG. 2, computer readable medium 130 may receive the file generated by file processing unit 128. In some examples, computer readable medium 130 comprises a computer readable storage medium such as a memory, optical disc, magnetic disk, or other type of non-transitory storage medium from which a computing device is able to read data. In some examples where computer readable medium 130 comprises a computer readable storage medium, the computer readable storage medium may form part of a device, such as source device 12, file generation device 34, a content delivery network device, or another type of device. In some examples, computer readable medium 130 comprises a computer-readable communication medium, such as an optical fiber, communication cable, electro-magnetic wave, or other types of media from which a computing device is able to read data.

In accordance with a technique of this disclosure, file processing unit 128 may generate files in accordance with techniques of this disclosure. For example, file processing unit 128 may generate data in a box within a file conforming to a file format for an AVC family of codecs or an HEVC family of codecs, the data being related to at least one of HDR, WCG video coding, VR, or 360-degree video content, the box comprising a syntax structure that includes the data, the file being associated with the media content, wherein the data is for use in determining whether a client is to accept or reject the media content associated with the file; and output the file. In some examples, the file is associated with the media content in that the file contains the media content (or an encoded version thereof) or the file includes metadata regarding the media content (or metadata regarding the encoded version of the media content).

In some examples, file processing unit 128 may obtain data from a decoder configuration record structure of a file conforming to a file format for a video codec, the data being related to at least one of HDR, WCG video coding, VR, or 360-degree video content, wherein the data is for use in determining whether a client to accept or reject the media content associated with the file; and output the file.

In some examples, file processing unit 128 may generate an element in a codecs parameter of a MIME type of a file, the element indicating a value of a color primaries syntax element, a transfer characteristics syntax element, and a matrix coefficients syntax element, wherein the data is for a client to determine whether to accept or reject media content associated with the file, wherein the codecs parameter indicates an AVC family of codecs; and output the file.

In some examples, file processing unit 128 may generate, in an element of a codecs parameter of a MIME type of a file, data for at least one of: VR, 360-degree video, or frame packing, wherein the data is for a client to determine whether to accept or reject media content associated with the file, wherein the codecs parameter indicates an AVC family of codecs; and output the file.

In some examples, file processing unit 128 may include, in an element of a codecs parameter of a MIME type of a file, a value of a color primaries syntax element, a transfer characteristics syntax element, and a matrix coefficients syntax element, wherein the codecs parameter indicates an HEVC family of codecs; and output the file.

In some examples, file processing unit 128 may include, in an element of a codecs parameter of a MIME type of a file, data relating to at least one of: VR, 360-degree video, or frame packing, wherein the codecs parameter indicates an HEVC family of codecs; and output the file.

In some examples, file processing unit 128 may include data in an element of a codecs parameter of a MIME type of a file, the data comprising an array of video information; and output the file.

In an example of this disclosure, file processing unit 128 may generate a box within a file conforming to a file format for an AVC family of codecs or an HEVC family of codecs. In this example, the box contains a list of types of essential SEI messages. In some examples, the box is encapsulated within one of AVCSampleEntry, AVC2SampleEntry, AVCSVCSampleEntry, AVC2SVCSampleEntry, SVCSampleEntry, AVCMVCSampleEntry, AVC2MVCSampleEntry, MVCSampleEntry, MVCDSampleEntry, A3DSampleEntry, HEVCSampleEntry, HEVCLHVCSampleEntry, or LHEVCSampleEntry. The box may comprise a syntax structure that includes the list. Furthermore, in this example, the file is associated with media content. In some examples, presence in the media content associated with the file of an SEI message belonging to an SEI message type in the list is required for a renderer to render the media content associated with the file such that the media content associated with the file meets or exceeds one or more quality criteria. File processing unit 128 may output the file. In some examples, the box is included in the file after decoder configuration boxes of the file (e.g., a AVCConfigurationBox, SVCConfigurationBox, MVCConfigurationBox, MVCDConfigurationBox, A3DConfigurationBox, HEVCConfigurationBox, or LHEVCConfigurationBox). Furthermore, in some examples, the box is in a sample entry structure.

In an example of this disclosure, file processing unit 128 may include a list of types of essential SEI messages in a decoder configuration record structure of a file conforming to a file format for a video codec. For instance, file processing unit 128 may include the list in an AVCDecoderConfigurationRecord or an HEVCDecoderConfigurationRecord, or another type of decoder configuration record. The file is associated with media content. Presence in the media content associated with the file of an SEI message belonging to an SEI message type in the list is required for a renderer to render the media content associated with the file such that the media content associated with the file meets or exceeds one or more quality criteria. Furthermore, file processing unit 128 may output the file. In some examples, the decoder configuration record structure is immediately after profile/tier/level syntax elements and before arrays of parameters sets and SEI NAL units. In some examples, the list is in a set of arrays, each respective array of the set of arrays including a respective set of profile/tier/level data, a respective set of HDR data, WCG data, VR data, 360-degree video data, or the list of types of essential SEI messages.

In an example of this disclosure, file processing unit 128 may generate an element in a codecs parameter of a MIME type of a file. The element includes an array of essential SEI message types. Each of the types may be indicated in a respective set of bits (e.g., 1 byte). The file is associated with media content. In this example, presence in the media content associated with the file of an SEI message belonging to an SEI message type in the list is required for a renderer to render the media content associated with the file such that the media content associated with the file meets or exceeds one or more quality criteria. Furthermore, in this example, the codecs parameter indicates an AVC family of codecs. In this example, file processing unit 128 may output the file. In some examples, file processing unit 128 may include, in the element, one or more bits that indicate the number of essential SEI message types in the array. For instance, the element may include a byte that is equal to the number of SEI message types in the array.

In an example of this disclosure, file processing unit 128 may include, in an element of a codecs parameter of a MIME type of a file, an array of essential SEI message types. In some examples, the element may be preceded by a '.' character and a string (e.g., "esei") indicating the element includes the array of essential SEI message types. In this example, the file is associated with media content. In this example, presence in the media content associated with the file of an SEI message belonging to an SEI message type in the list is required for a renderer to render the media content associated with the file such that the media content associated with the file meets or exceeds one or more quality criteria. In this example, the codecs parameter indicates an HEVC family of codecs. Furthermore, in this example, file processing unit 128 may output the file.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. For instance, video decoder 30 includes integrated circuitry, and the various units illustrated in FIG. 3 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 3 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 3, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118 of FIG. 2.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

Inverse quantization unit 154 may perform particular techniques of this disclosure. For example, for at least one respective quantization group of a plurality of quantization groups within a CTB of a CTU of a picture of the video data, inverse quantization unit 154 may derive, based at least in part on local quantization information signaled in the bitstream, a respective quantization parameter for the respective quantization group. Additionally, in this example, inverse quantization unit 154 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 156, reconstruction unit 158, and filter unit 160) may reconstruct, based on inverse quantized transform coefficients of the transform block, a coding block of the CU.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

In the example of FIG. 3, computer readable medium 148 comprises a computer readable storage medium such as a memory, optical disc, magnetic disk, or other type of non-transitory storage medium from which a computing device is able to read data. In some examples where computer readable medium 148 comprises a computer readable storage medium, the computer readable storage medium may form part of a device, such as source device 12, file generation device 34, a content delivery network device, or another type of device. In some examples, computer readable medium 148 comprises a computer-readable communication medium, such as an optical fiber, communication cable, electro-magnetic wave, or other types of media from which a computing device is able to read data.

Furthermore, in the example of FIG. 3, a file processing unit 149 receives a file or portions of a file from computer readable medium 148. File processing unit 149 may be implemented by one or more processors of a device, such as destination device 14, a media aware network element (MANE), a content delivery network device, or another type of device.

File processing unit 149 may process the file in accordance with the techniques of this disclosure. For example, file processing unit 149 may obtain data from a box within a file conforming to a file format for an AVC family of codecs or an HEVC family of codecs, the data being related to at least one of HDR, WCG video coding, VR, or 360-degree video content, the box comprising a syntax structure that includes the data, the file being associated with the media content; and determine, based on the data obtained from the box, whether to accept or reject the media content associated with the file.

In some examples, file processing unit 149 may obtain data from a decoder configuration record structure of a file conforming to a file format for a video codec, the data being related to at least one of HDR, WCG video coding, VR, or 360-degree video content; and determine, based on the data, whether to accept or reject the media content associated with the file.

In some examples, file processing unit 149 may determine, based on an element of a codecs parameter of a MIME type of a file, a value of a color primaries syntax element, a transfer characteristics syntax element, and a matrix coefficients syntax element, wherein the codecs parameter indicates an AVC family of codecs; and determine, based on the data, whether to accept or reject media content associated with the file.

In some examples, file processing unit 149 may determine, based on an element of a codecs parameter of a MIME type of a file, data for at least one of: VR, 360-degree video, or frame packing, wherein the codecs parameter indicates an AVC family of codecs; and determine, based on the data, whether to accept or reject media content associated with the file.

In some examples, file processing unit 149 may determine, based on an element of a codecs parameter of a MIME type of a file, a value of a color primaries syntax element, a transfer characteristics syntax element, and a matrix coefficients syntax element, wherein the codecs parameter indicates an HEVC family of codecs; and determine, based on the data, whether to accept or reject media content associated with the file.

In some examples, file processing unit 149 may determine, based on an element of a codecs parameter of a MIME type of a file, data relating to at least one of: VR, 360-degree video, or frame packing, wherein the codecs parameter indicates an HEVC family of codecs; and determine, based on the data, whether to accept or reject media content associated with the file.

In some examples, file processing unit 149 may determine data based on an element of a codecs parameter of a MIME type of a file, the data comprising an array of video information; and determine, based on the data, whether to accept or reject media content associated with the file.

In some examples, file processing unit 149 may obtain a list of types of essential SEI messages from a box within a file conforming to a file format for an AVC family of codecs or an HEVC family of codecs. In some examples, the box is encapsulated within one of AVCSampleEntry, AVC2SampleEntry, AVC SVCSampleEntry, AVC2SVCSampleEntry, SVC SampleEntry, AVCMVCSampleEntry, AVC2MVCSampleEntry, MVCSampleEntry, MVCDSampleEntry, A3DSampleEntry, HEVCSampleEntry, HEVCLHVCSampleEntry, or LHEVCSampleEntry. The box may comprises a syntax structure that includes the list. Furthermore, the file is associated with media content. Additionally, in some examples, file processing unit 149 may determine, based on the media content including an SEI message belonging to an SEI message type in the list, that a renderer (e.g., a video decoder, such as video decoder 30) is able to render the media content such that the media content meets or exceeds one or more quality criteria. The box may be included in the file after decoder configuration boxes of the file (e.g., a AVCConfigurationBox, SVCConfigurationBox, MVCConfigurationBox, MVCDConfigurationBox, A3DConfigurationBox, HEVCConfigurationBox, or LHEVCConfigurationBox). In some examples, the box is in a sample entry structure. In some examples, the box may follow a ColourDescriptorBox in the sample entry structure. Furthermore, in some examples, based on the determination that the renderer is able to render the media content such that the media content meets or exceeds the one or more quality criteria, file processing unit 149 may perform at least one of: requesting the media content associated with the file from a streaming server, decoding the media content associated with the file.

In some examples, file processing unit 149 may obtain a list of types of essential SEI messages from a decoder configuration record structure of a file conforming to a file format for a video codec. File processing unit 149 may determine, based on the media content including an SEI message belonging to an SEI message type in the list, that a renderer is able to render the media content such that the media content meets or exceeds one or more quality criteria. In some instances, the decoder configuration record structure is one of: an AVCDecoderConfigurationRecord or an HEVCDecoderConfigurationRecord. The decoder configuration record structure may be immediately after profile/tier/level syntax elements and before arrays of parameters sets and SEI NAL units. Furthermore, in some examples, the list is in a set of arrays, each respective array of the set of arrays including a respective set of profile/tier/level data, a respective set of HDR data, WCG data, VR data, 360-degree video data, or the list of types of essential SEI messages. Furthermore, in some examples, based on the determination that the renderer is able to render the media content such that the media content meets or exceeds the one or more quality criteria, file processing unit 149 may perform at least one of: requesting the media content associated with the file from a streaming server, decoding the media content associated with the file.

In an example of this disclosure, file processing unit 149 may determine, based on an element of a codecs parameter (e.g., an 'avcoti' element or another element) of a MIME type of a file, an array of essential SEI message types. Each of the types may be indicated in a respective set of bits (e.g., 1 byte). In this example, the codecs parameter indicates an AVC family of codecs. Furthermore, in some examples, file processing unit 149 may determine, based on the media content including an SEI message belonging to an SEI message type in the list, that a renderer is able to render the media content such that the media content meets or exceeds one or more quality criteria. In some examples, file processing unit 149 may obtain, from the element, one or more bits that indicate the number of essential SEI message types in the array. For instance, the element may include a byte that is equal to the number of SEI message types in the array. Furthermore, in some examples, based on the determination that the renderer is able to render the media content such that the media content meets or exceeds the one or more quality criteria, file processing unit 149 may perform at least one of: requesting the media content associated with the file from a streaming server, decoding the media content associated with the file.

In an example of this disclosure, file processing unit 149 may determine, based on an element of a codecs parameter of a MIME type of a file, an array of essential SEI message types. In some examples, the element may be preceded by a '.' character and a string (e.g., "esei") indicating the element includes the array of essential SEI message types. In this example, the codecs parameter indicates an HEVC family of codecs. Furthermore, in this example, file processing unit 149 may determine, based on the media content including an SEI message belonging to an SEI message type in the list, that a renderer is able to render the media content such that the media content meets or exceeds one or more quality criteria. In this example, file processing unit 149 may obtain, from the element, one or more bits that indicate the number of essential SEI message types in the array. Furthermore, in some examples, based on the determination that the renderer is able to render the media content such that the media content meets or exceeds the one or more quality criteria, file processing unit 149 may perform at least one of: requesting the media content associated with the file from a streaming server, decoding the media content associated with the file.

Figure 4:
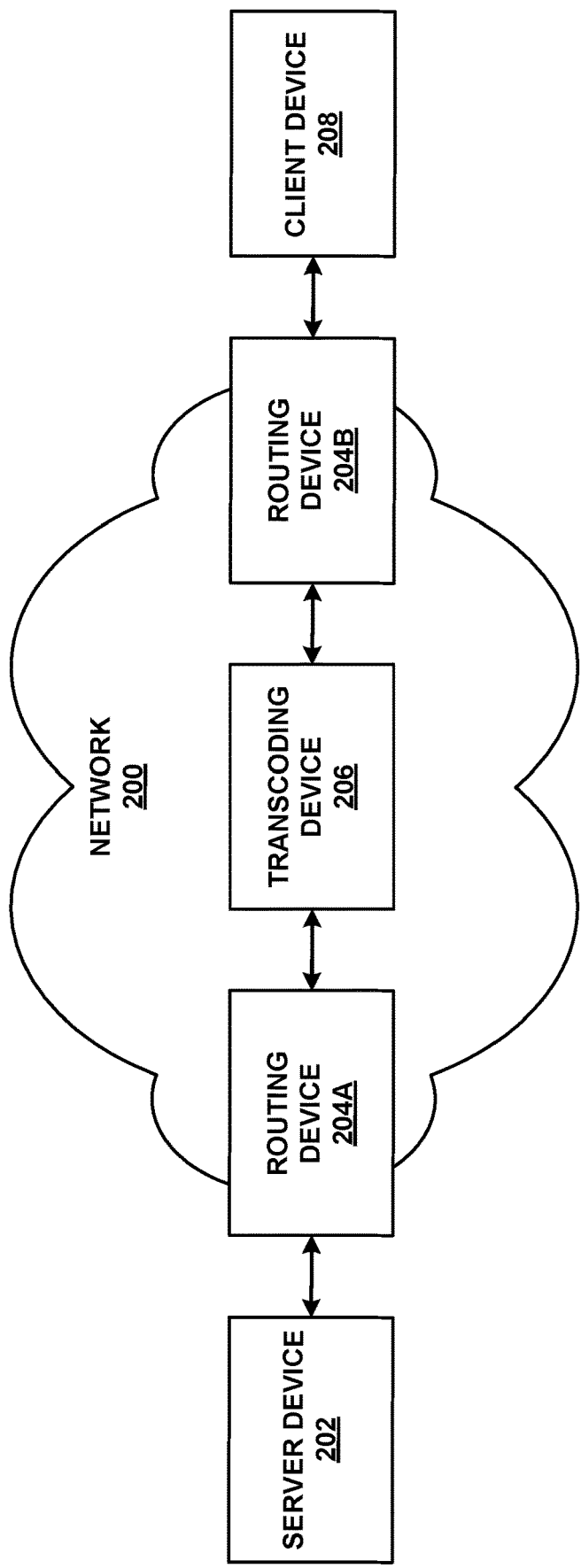
FIG. 4 is a block diagram illustrating an example set of devices that form part of a network.

FIG. 4 is a block diagram illustrating an example set of devices that form part of network 200. In this example, network 200 includes routing devices 204A, 204B (routing devices 204) and transcoding device 206. Routing devices 204 and transcoding device 206 are intended to represent a small number of devices that may form part of network 200. Other network devices, such as switches, hubs, gateways, firewalls, bridges, and other such devices may also be included within network 200. Moreover, additional network devices may be provided along a network path between server device 202 and client device 208. Server device 202 may correspond to source device 12 (FIG. 1), while client device 208 may correspond to destination device 14 (FIG. 1), in some examples.

In general, routing devices 204 implement one or more routing protocols to exchange network data through network 200. In some examples, routing devices 204 may be configured to perform proxy or cache operations. Therefore, in some examples, routing devices 204 may be referred to as proxy devices. In general, routing devices 204 execute routing protocols to discover routes through network 200. By executing such routing protocols, routing device 204B may discover a network route from itself to server device 202 via routing device 204A.

The techniques of this disclosure may be implemented by network devices such routing devices 204 and transcoding device 206, but also may be implemented by client device 208. In this manner, routing devices 204, transcoding device 206, and client device 208 represent examples of devices configured to perform the techniques of this disclosure. Moreover, the devices of FIG. 1, and video encoder 20 illustrated in FIG. 2 and video decoder 30 illustrated in FIG. 3 are also examples of devices that can be configured to perform one or more of the techniques of this disclosure.

Figure 5:
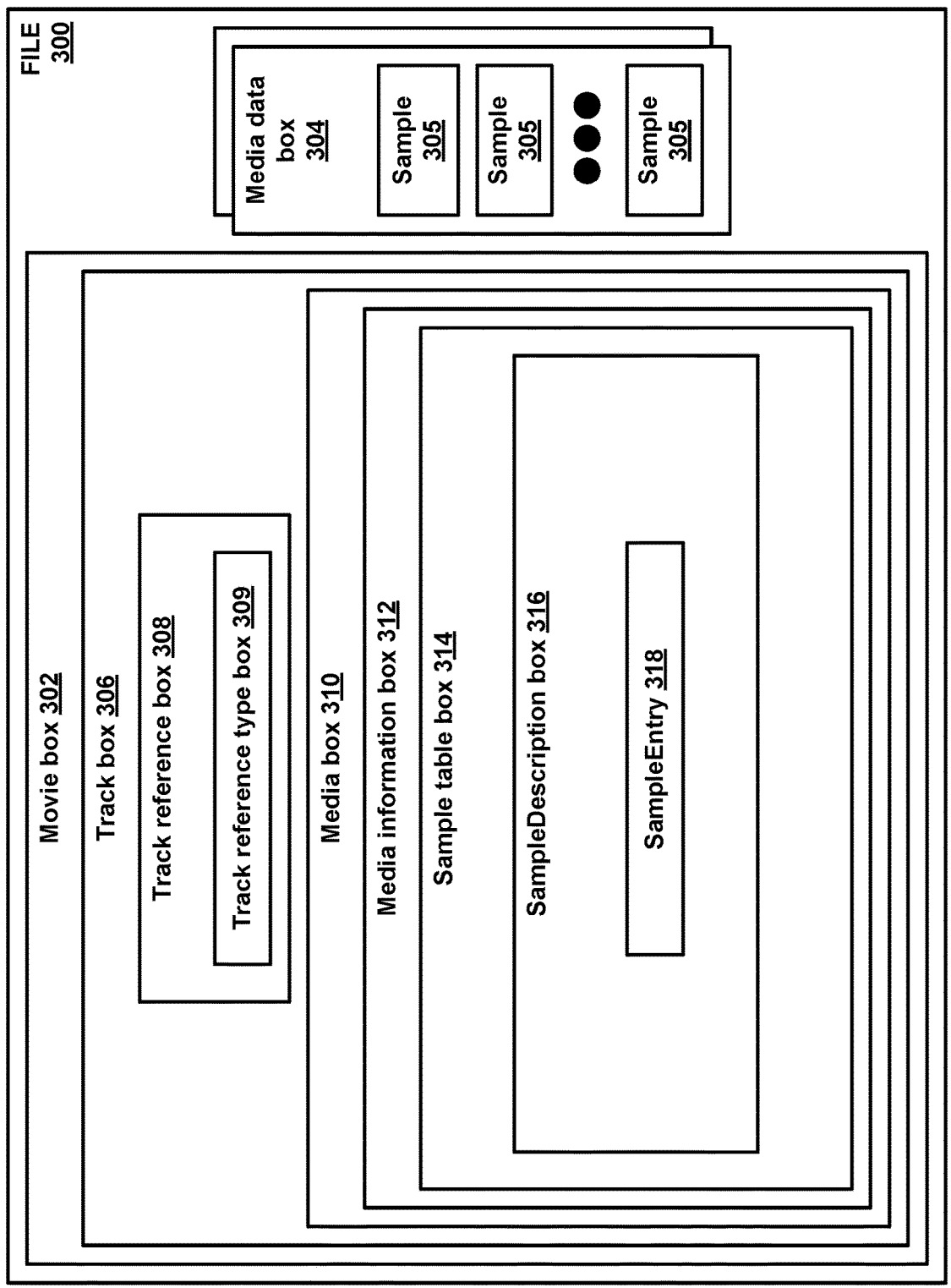
FIG. 5 is a conceptual diagram illustrating an example structure of a file, in accordance with one or more techniques of this disclosure.

FIG. 5 is a conceptual diagram illustrating an example structure of a file 300, in accordance with one or more techniques of this disclosure. In the example of FIG. 5, file 300 includes a movie box 302 and a plurality of media data boxes 304. Although illustrated in the example of FIG. 5 as being in the same file, in other examples, movie box 302 and media data boxes 304 may be in separate files. As indicated above, a box may be an object-oriented building block defined by a unique type identifier and length. For instance, a box may be the elementary syntax structure in the ISOBMFF, including a four-character coded box type, a byte count of the box, and a payload.

Movie box 302 may contain metadata for tracks of file 300. Each track of file 300 may comprise a continuous stream of media data. Each of media data boxes 304 may include one or more samples 305. Each of samples 305 may comprise an audio or video access unit. Each access unit may comprise multiple coded pictures in multi-view coding (e.g., MV-HEVC and 2D-HEVC) and scalable video coding (e.g., SHVC). For instance, an access unit may include one or more coded pictures for each layer.

Furthermore, in the example of FIG. 5, movie box 302 includes a track box 306. Track box 306 may enclose metadata for a track of file 300. In other examples, movie box 302 may include multiple track boxes for different tracks of file 300. Track box 306 includes a track reference box 308 and a media box 310. Track reference box 308 may include a track reference type box 309. Track reference type box 309 may be associated with a type (e.g., 'tbas') and a track identifier identifying another track. In accordance with the sixth technique of this disclosure, track reference boxes of tile tracks may or may not include track reference type boxes associated with the type identifier 'tbas'.

Media box 310 may contain all objects that declare information about the media data within the track. Media box 310 includes a media information box 312. Media information box 312 may contain all objects that declare characteristic information of the media of the track. Media information box 312 includes a sample table box 314. Sample table box 314 may specify sample-specific metadata.

In the example of FIG. 5, sample table box 314 includes a SampleDescription box 316, and SampleDescription box 316 includes Sample Entry 318. In other examples, sample table box 314 may include other boxes in addition to SampleDescription box 316 and Sample Entry 318. Although not shown in FIG. 5, Sample Entry 318 may include a decoder configuration record. As described in more detail above, this disclosure describes techniques for including new types of important information in a sample entry such as Sample Entry 318.

Figure 6:
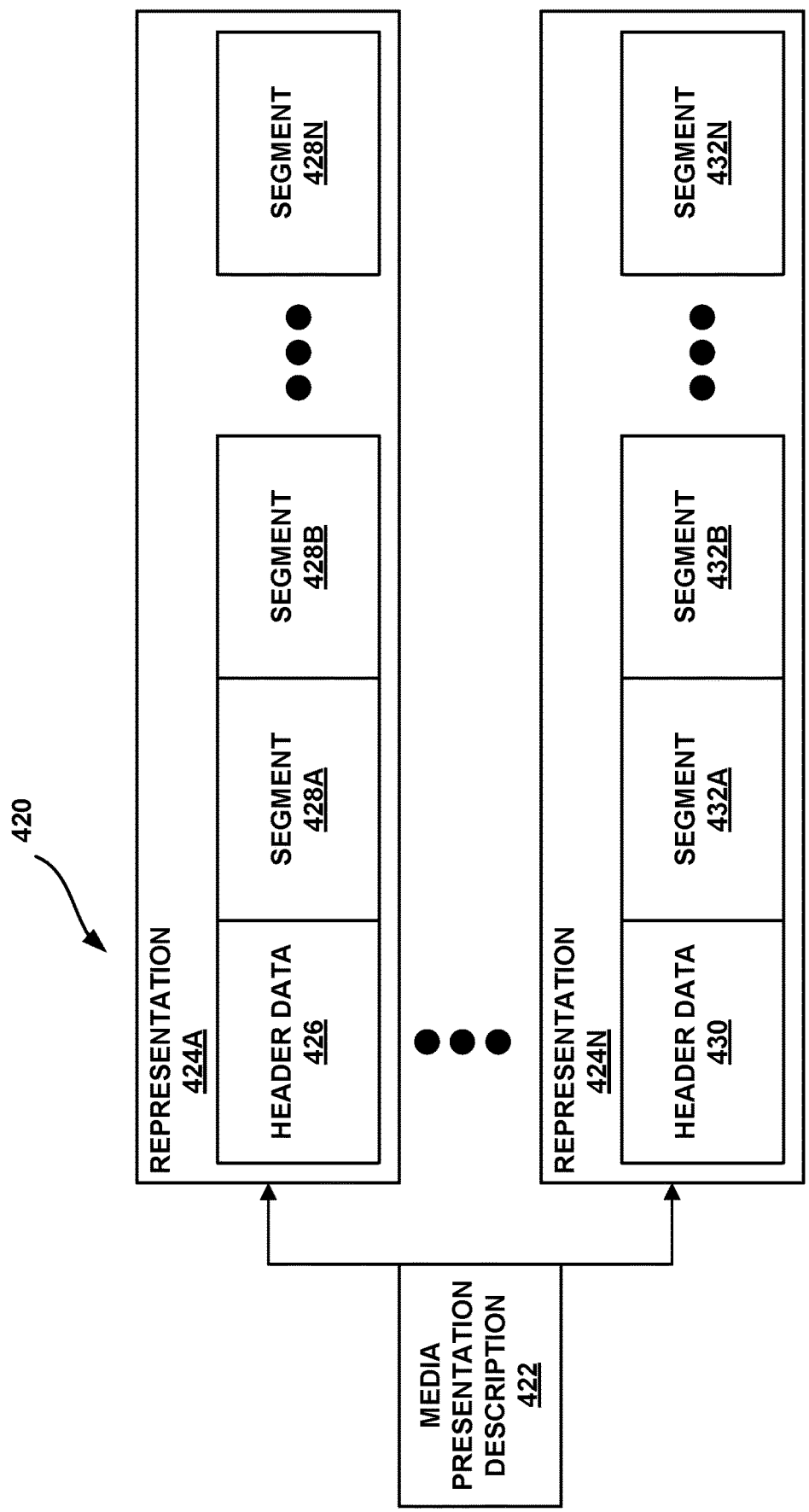
FIG. 6 is a conceptual diagram illustrating elements of example multimedia content.

FIG. 6 is a conceptual diagram illustrating elements of example multimedia content 420. In the example of FIG. 6, multimedia content 420 includes MPD 422 and a plurality of representations 424A-424N (representations 424). Representation 424A includes optional header data 426 and segments 428A-428N (segments 428), while representation 424N includes optional header data 430 and segments 432A-432N (segments 432). The letter N is used to designate the last movie fragment in each of representations 424 as a matter of convenience. In some examples, there may be different numbers of movie fragments between representations 424.

MPD 422 may comprise a data structure separate from representations 424. MPD 422 may correspond to manifest file 66 of FIG. 4. In general, MPD 422 may include data that generally describes characteristics of representations 424, such as coding and rendering characteristics, adaptation sets, a profile to which MPD 422 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 426, when present, may describe characteristics of segments 428, e.g., temporal locations of random access points (RAPs, also referred to as stream access points (SAPs)), which of segments 428 includes random access points, byte offsets to random access points within segments 428, uniform resource locators (URLs) of segments 428, or other aspects of segments 428. Header data 430, when present, may describe similar characteristics for segments 432. Additionally or alternatively, such characteristics may be fully included within MPD 422.

Segments 428, 432 include one or more coded video samples, each of which may include frames or slices of video data. Each of the coded video samples of segments 428 may have similar characteristics, e.g., height, width, and bandwidth requirements. Such characteristics may be described by data of MPD 422, though such data is not illustrated in the example of FIG. 6. MPD 422 may include characteristics as described by the 3GPP Specification, with the addition of any or all of the signaled information described in this disclosure.

Each of segments 428, 432 may be associated with a unique uniform resource locator (URL). Thus, each of segments 428, 432 may be independently retrievable using a streaming network protocol, such as DASH. In this manner, a destination device, such as client device 40, may use an HTTP GET request to retrieve segments 428 or 432. In some examples, client device 40 may use HTTP partial GET requests to retrieve specific byte ranges of segments 428 or 432.

Figure 7:
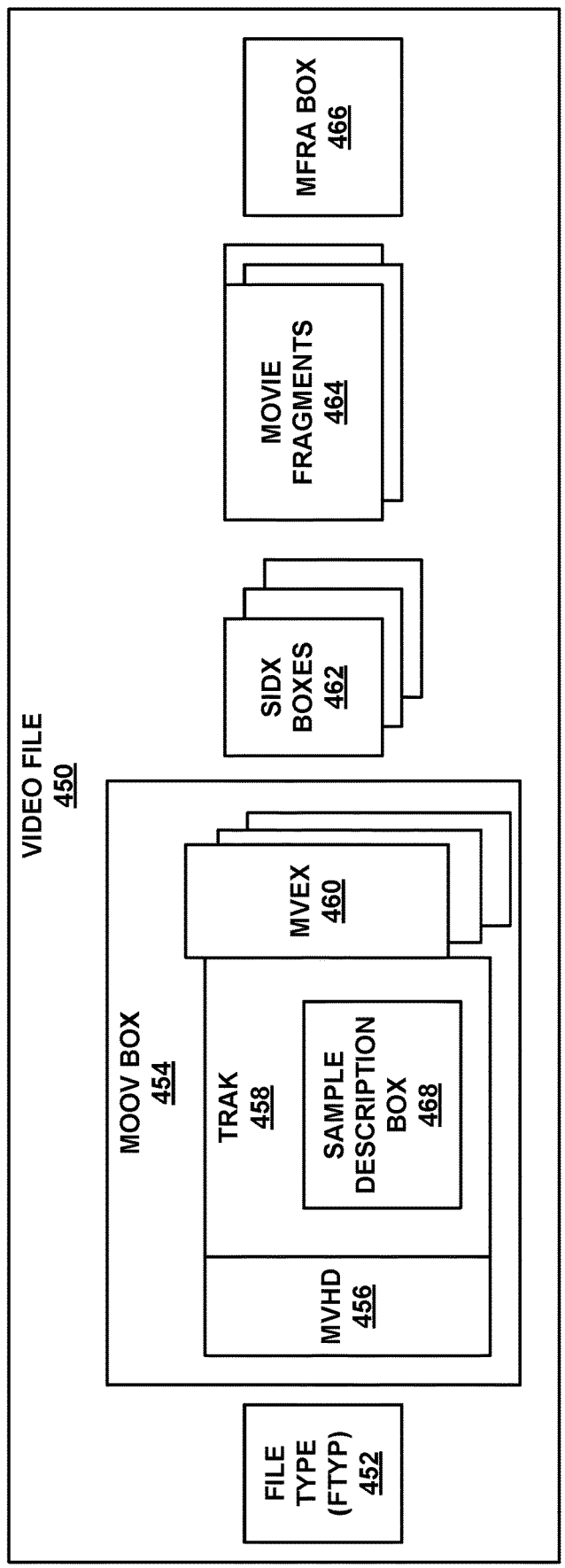
FIG. 7 is a block diagram illustrating elements of an example video file.

FIG. 7 is a block diagram illustrating elements of an example video file 450. Video file 450 may be said to encapsulate a segment. As described above, video files in accordance with the ISO base media file format and extensions thereof store data in a series of objects, referred to as "boxes." In the example of FIG. 7, video file 450 includes file type (FTYP) box 452, movie (MOOV) box 454, segment index (sidx) boxes 462, movie fragment (MOOF) boxes 464, and movie fragment random access (MFRA) box 466. Although FIG. 7 represents an example of a video file, it should be understood that other media files may include other types of media data (e.g., audio data, timed text data, or the like) that is structured similarly to the data of video file 450, in accordance with the ISO base media file format and its extensions.

FTYP box 452 generally describes a file type for video file 450. File type box 452 may include data that identifies a specification that describes a best use for video file 450. File type box 452 may alternatively be placed before MOOV box 454, movie fragment boxes 464, and/or MFRA box 466.

In some examples, a segment, such as video file 450, may include an MPD update box (not shown) before FTYP box 452. The MPD update box may include information indicating that an MPD corresponding to a representation including video file 450 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 450, where the STYP box may define a segment type for video file 450.

MOOV box 454, in the example of FIG. 7, includes movie header (MVHD) box 456, track (TRAK) box 458, and one or more movie extends (MVEX) boxes 460. In general, MVHD box 456 may describe general characteristics of video file 450. For example, MVHD box 456 may include data that describes when video file 450 was originally created, when video file 450 was last modified, a timescale for video file 450, a duration of playback for video file 450, or other data that generally describes video file 450.

TRAK box 458 may include data for a track of video file 450. TRAK box 458 may include a track header (TKHD) box that describes characteristics of the track corresponding to TRAK box 458. In some examples, TRAK box 458 may include coded video pictures, while in other examples, the coded video pictures of the track may be included in movie fragments 464, which may be referenced by data of TRAK box 458 and/or sidx boxes 462.

In some examples, video file 450 may include more than one track. Accordingly, MOOV box 454 may include a number of TRAK boxes equal to the number of tracks in video file 450. TRAK box 458 may describe characteristics of a corresponding track of video file 450. For example, TRAK box 458 may describe temporal and/or spatial information for the corresponding track. A TRAK box similar to TRAK box 458 of MOOV box 454 may describe characteristics of a parameter set track, when a parameter set track is included in a video file, such as video file 450. The presence of sequence level SEI messages may be signaled in the parameter set track within the TRAK box describing the parameter set track.

MVEX boxes 460 may describe characteristics of corresponding movie fragments 464, e.g., to signal that video file 450 includes movie fragments 464, in addition to video data included within MOOV box 454, if any. In the context of streaming video data, coded video pictures may be included in movie fragments 464 rather than in MOOV box 454. Accordingly, all coded video samples may be included in movie fragments 464, rather than in MOOV box 454.

MOOV box 454 may include a number of MVEX boxes 460 equal to the number of movie fragments 464 in video file 450. Each of MVEX boxes 460 may describe characteristics of a corresponding one of movie fragments 464. For example, each MVEX box may include a movie extends header box (MEHD) box that describes a temporal duration for the corresponding one of movie fragments 464.

A sequence data set may be stored in a video sample that does not include actual coded video data. A video sample may generally correspond to an access unit, which is a representation of a coded picture at a specific time instance. In the context of AVC, the coded picture includes one or more VCL NAL units which contains the information to construct all the pixels of the access unit and other associated non-VCL NAL units, such as SEI messages. Accordingly, a sequence data set, which may include sequence level SEI messages, may be included in one of movie fragments 464. The presence of a sequence data set and/or sequence level SEI messages may be signaled as being present in one of movie fragments 464 within the one of MVEX boxes 460 corresponding to the one of movie fragments 464.

SIDX boxes 462 are optional elements of video file 450. That is, video files conforming to the 3GPP file format, or other such file formats, do not necessarily include SIDX boxes 462. In accordance with the example of the 3GPP file format, a SIDX box may be used to identify a sub-segment of a segment (e.g., a segment contained within video file 450). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 462 generally provide information representative of one or more sub-segments of a segment included in video file 450. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 464 may include one or more coded video pictures. In some examples, movie fragments 464 may include one or more groups of pictures (GOPs), each of which may include a number of coded video pictures, e.g., frames or pictures. In addition, as described above, movie fragments 464 may include sequence data sets in some examples. Each of movie fragments 464 may include a movie fragment header box (MFHD, not shown in FIG. 7). The MFHD box may describe characteristics of the corresponding movie fragment, such as a sequence number for the movie fragment. Movie fragments 464 may be included in order of sequence number in video file 450.

MFRA box 466 may describe random access points within movie fragments 464 of video file 450. This may assist with performing trick modes, such as performing seeks to particular temporal locations (i.e., playback times) within a segment encapsulated by video file 450. MFRA box 466 is generally optional and need not be included in video files, in some examples. Likewise, a client device, such as client device 40, does not necessarily need to reference MFRA box 466 to correctly decode and display video data of video file 450. MFRA box 466 may include a number of track fragment random access (TFRA) boxes (not shown) equal to the number of tracks of video file 450, or in some examples, equal to the number of media tracks (e.g., non-hint tracks) of video file 450.

In some examples, movie fragments 464 may include one or more stream access points (SAPs), such as IDR pictures. Likewise, MFRA box 466 may provide indications of locations within video file 450 of the SAPs. Accordingly, a temporal sub-sequence of video file 450 may be formed from SAPs of video file 450. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Video file 450 also contains sample description box 468, in this example. In particular, sample description box 468 is included within TRAK box 458, in this example. In the example of FIG. 7, sample description box 468 does not include video data encoded according to the codec.

An example sample description box 468 may be defined as follows:

Sample Entry and Box Types: 'hvc2', 'hev2', 'lhe1', 'lhvC'
   Container: Sample Description Box ('stsd')
   Mandatory: An 'hvc1', 'hev1', 'hvc2', 'hev2', or 'lhe1' sample entry is mandatory
   Quantity: One or more sample entries may be present In this example definition for sample description box 468, when the sample entry name is the default and mandatory value of array_completeness is 4 for arrays of all types of parameter sets, and 0 for all other arrays. When the sample entry name is 'lhe1', the default value of array_completeness is 0 for all arrays.

Figure 8:
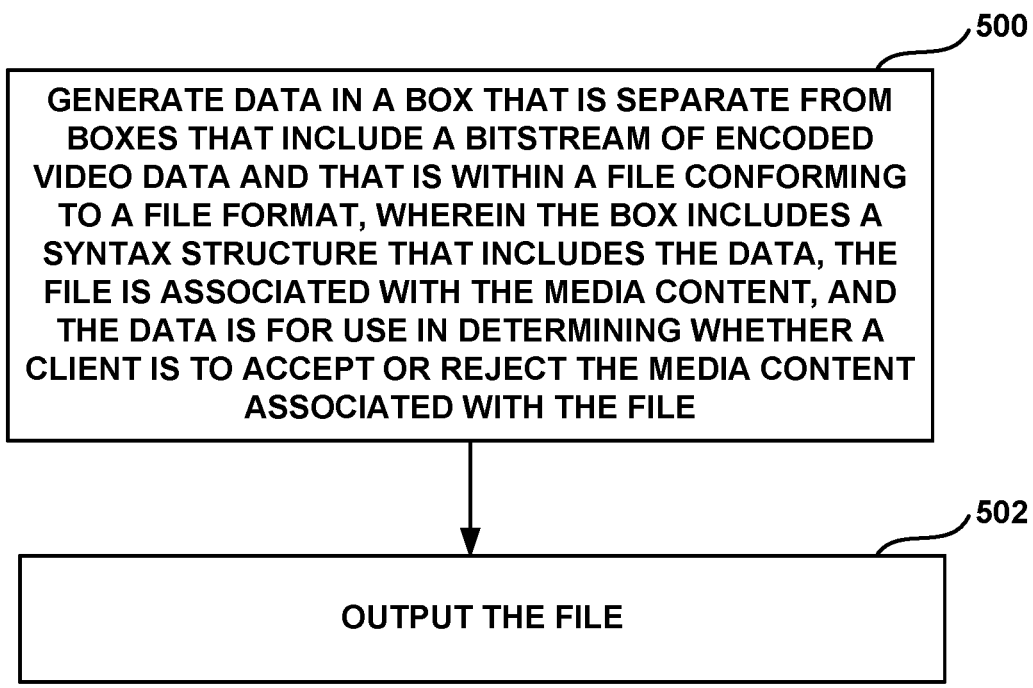
FIG. 8 is a flowchart illustrating an example operation of a device for processing a file, in accordance with a technique of this disclosure.

FIG. 8 is a flowchart illustrating an example operation of a device for processing a file, in accordance with a technique of this disclosure. The flowcharts of this disclosure are provided as examples. In other examples, different actions may be performed or actions may be performed in different orders, or in parallel. The example of FIG. 8 may be performed by various types of devices, such as source device 12 (FIG. 1), file generation device 34 (FIG. 1), file processing unit 128 (FIG. 2), a file server (e.g., server device 202 of FIG. 4), a streaming device, a MANE, or another type of device or unit.

In the example of FIG. 8, the device generates data in a box that is separate from boxes that include a bitstream of encoded video data and that is within a file conforming to a file format (500). The box includes a syntax structure that includes the data, and the file is associated with the media content. The data is for use in determining whether a client is to accept or reject the media content associated with the file. The device may generate, for inclusion in the box, a list of types of SEI messages, and the syntax structure may include the list. In some examples, the box may be a sample entry structure. In some examples, the box may be included in the file after decoder configuration boxes of the file. In other examples, the box may include an MPD box that includes a list of media available on a streaming server. In some examples, the data is included in a codecs parameter included in the MPD box. The device outputs the file (502). The device may, for example, output the file by storing the file on a computer readable medium or by transmitting the file to another device.

Figure 9:
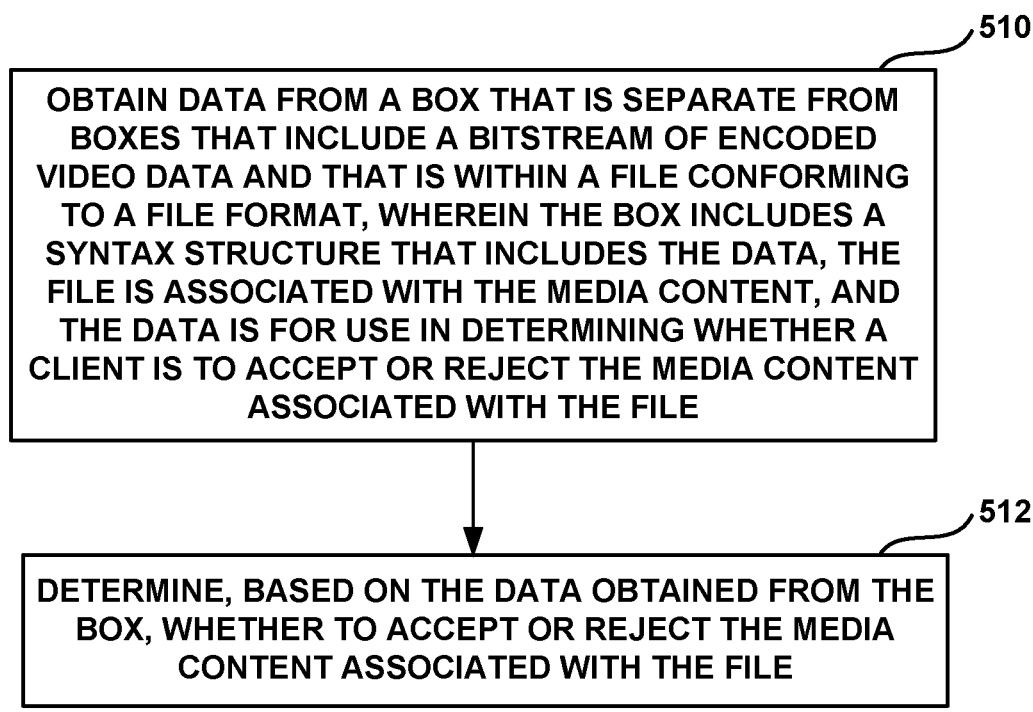
FIG. 9 is a flowchart illustrating an example operation of a device for processing a file, in accordance with a technique of this disclosure.

FIG. 9 is a flowchart illustrating an example operation of a device for processing a file, in accordance with a technique of this disclosure. The example of FIG. 9 may be performed by various types of devices, such as destination device 14, file processing unit 149, client device 208, a file server, a streaming device, a MANE, or another type of device.

In the example of FIG. 9, the device obtains data from a box that is separate from boxes that include a bitstream of encoded video data and that is within a file conforming to a file format for a video codec (510). The box includes a syntax structure that includes the data, and the file is associated with the media content. The media content is coded according to the video codec. The device may, for example, obtain, from the box, a list of types of SEI messages and determine, based on the media content including an SEI message belonging to an SEI message type in the list, that a renderer is able to render the media content such that the media content meets or exceeds one or more quality criteria. In some examples, the box is in a sample entry structure. In some examples, the box includes a decoder configuration record structure that includes the data. In some examples, the box is included in the file after decoder configuration boxes of the file. In other examples, the box includes an MPD box that includes a list of media available on a streaming server. In some examples, the data is included in a codecs parameter included in the MPD box.

The device determines, based on the data obtained from the box, whether to accept or reject the media content associated with the file (512). Based on a determination to accept the media content associated with the file, the device may request the media content associated with the file from the streaming server. For example, based on the determination that the renderer is able to render the media content such that the media content meets or exceeds the one or more quality criteria, the device may request the media content associated with the file from a streaming server and/or decode the media content associated with the file. The media content may, for example, include one or more of high-dynamic range video content, wide color gamut video content, VR video content, or 360-degree video content. After receiving the requested media content, the device may, for example, decode the media content and output the content for display or may forward the media content to another device that decodes the media content and outputs the media content for display.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, TUs, macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

The techniques of this disclosure may be applied to video coding in support of any of a variety of multimedia applications, such as over-the-air television broadcasts, cable television transmissions, satellite television transmissions, Internet streaming video transmissions, such as DASH, digital video that is encoded onto a data storage medium, decoding of digital video stored on a data storage medium, or other applications.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for processing media content, the method comprising:
   obtaining, from a box separate from boxes comprising a bitstream of encoded video data, a list of types of Supplemental Enhancement Information (SEI) messages and video usability information required to render video data that comprises one or both of high dynamic range video data or wide color gamut video data, the box being within a file conforming to a file format for a video codec, the box comprising a syntax structure that includes the list of types of SEI messages, the file being associated with the media content, the media content being coded according to the video codec, and the video usability information comprising one or more of color primaries, transfer characteristics, or matrix coefficients for rendering the video data; and
   determining, based on the list obtained from the box, whether to accept or reject the media content associated with the file, wherein determining, based on the list obtained from the box, whether to accept or reject the media content associated with the file comprises determining, based on the media content including an SEI message belonging to an SEI message type in the list, that a renderer is able to render the media content such that the media content meets or exceeds one or more quality criteria.

2. The method of claim 1, further comprising:
   based on the determination that the renderer is able to render the media content such that the media content meets or exceeds the one or more quality criteria, performing at least one of:
   requesting the media content associated with the file from a streaming server; or
   decoding the media content associated with the file.

3. The method of claim 1, wherein the box is in a sample entry structure.

4. The method of claim 1, wherein the box is a decoder configuration record structure that includes the list.

5. The method of claim 1, wherein the box comprises a media presentation description (MPD) box, the MPD box including a list of media available on a streaming server.

6. The method of claim 5, wherein the list is included in a codecs parameter included in the MPD box.

7. The method of claim 5, further comprising:
   based on a determination to accept the media content associated with the file, requesting the media content associated with the file from the streaming server.

8. A method for processing media content, the method comprising:
   generating data in a box separate from boxes comprising a bitstream of encoded video data, the box being within a file conforming to a file format, the box comprising a syntax structure that includes a list of types of Supplemental Enhancement Information (SEI) messages and video usability information required to render video data that comprises one or both of high dynamic range video data or wide color gamut video data, wherein the video usability information comprises one or more of color primaries, transfer characteristics, or matrix coefficients for rendering the video data, and the file being associated with the media content, wherein the list is for use in determining whether a client is to accept or reject the media content associated with the file; and
   outputting the file.

9. The method of claim 8, wherein the box is in a sample entry structure.

10. The method of claim 8, wherein the box is included in the file after decoder configuration boxes of the file.

11. The method of claim 8, wherein the box comprises a media presentation description (MPD) box, the MPD box including a list of media available on a streaming server.

12. The method of claim 11, wherein the list is included in a codecs parameter included in the MPD box.

13. An apparatus for processing media content, the device comprising:
one or more storage media configured to store the media content; and
one or more processing circuits coupled to the one or more storage media, the one or more processing circuits configured to:
obtain, from a box separate from boxes comprising a bitstream of encoded video data, a list of types of Supplemental Enhancement Information (SEI) messages and video usability information required to render video data that comprises one or both of high dynamic range video data or wide color gamut video data, the box being within a file conforming to a file format for a video codec, the box comprising a syntax structure that includes the list of types of SEI messages, the file being associated with the media content and the media content being coded according to the video codec, and the video usability information comprising one or more of color primaries, transfer characteristics, or matrix coefficients for rendering the video data; and
determine, based on the list obtained from the box, whether to accept or reject the media content associated with the file, wherein to determine, based on the list obtained from the box, whether to accept or reject the media content associated with the file, the one or more processing circuits are further configured to determine, based on the media content including an SEI message belonging to an SEI message type in the list, that a renderer is able to render the media content such that the media content meets or exceeds one or more quality criteria.

14. The apparatus of claim 13, wherein the one or more processing circuits are further configured to:
based on the determination that the renderer is able to render the media content such that the media content meets or exceeds the one or more quality criteria, perform at least one of:
requesting the media content associated with the file from a streaming server; or
decoding the media content associated with the file.

15. The apparatus of claim 13, wherein the box is in a sample entry structure.

16. The apparatus of claim 13, wherein the box comprises a decoder configuration record structure that includes the list.

17. The apparatus of claim 13, wherein the box is included in the file after decoder configuration boxes of the file.

18. The apparatus of claim 13, wherein the box comprises a media presentation description (MPD) box, the MPD box including a list of media available on a streaming server.

19. The apparatus of claim 18, wherein the list is included in a codecs parameter included in the MPD box.

20. The apparatus of claim 18, wherein the one or more processing circuits are further configured to:
based on a determination to accept the media content associated with the file, request the media content associated with the file from the streaming server.

21. An apparatus for processing media content, the device comprising:
one or more storage media configured to store the media content; and
one or more processing circuits coupled to the one or more storage media, the one or more processing circuits configured to:
generate data in a box separate from boxes comprising a bitstream of encoded video data, the box being within a file conforming to a file format, the box comprising a syntax structure that includes a list of types of Supplemental Enhancement Information (SEI) messages and video usability information required to render video data that comprises one or both of high dynamic range video data or wide color gamut video data, wherein the video usability information comprises one or more of color primaries, transfer characteristics, or matrix coefficients for rendering the video data, and the file being associated with the media content, wherein the list is for use in determining whether a client is to accept or reject the media content associated with the file; and
output the file.

22. The apparatus of claim 21, wherein the box is in a sample entry structure.

23. The apparatus of claim 21, wherein the box is included in the file after decoder configuration boxes of the file.

24. The apparatus of claim 21, wherein the box comprises a media presentation description (MPD) box, the MPD box including a list of media available on a streaming server.

25. The apparatus of claim 24, wherein the list is included in a codecs parameter included in the MPD box.

* * * * *